United States Patent [19]
Suzuki

[11] Patent Number: 5,808,722
[45] Date of Patent: *Sep. 15, 1998

[54] APPARATUS FOR EXTENDING AND REPRODUCING VIDEO AND AUDIO DATA AND A VIDEO AND AUDIO SYNCHRONIZATION CONTROLLER

[75] Inventor: Mitsuyoshi Suzuki, Tokyo, Japan

[73] Assignee: Mitsubishi Denki Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 655,887

[22] Filed: May 31, 1996

[30] Foreign Application Priority Data

Jan. 29, 1996 [JP] Japan .................................. 8-012769

[51] Int. Cl.$^6$ .................................................. G03B 31/00
[52] U.S. Cl. ............................... 352/12; 352/20; 345/515
[58] Field of Search .................................. 352/12, 20, 22, 352/24; 3248/423, 512, 513, 515

[56] References Cited

U.S. PATENT DOCUMENTS

| | | | |
|---|---|---|---|
| 3,944,348 | 3/1976 | Freudenschuss | 352/5 |
| 4,461,552 | 7/1984 | Levine | 352/27 |
| 4,832,481 | 5/1989 | Beauviala | 352/5 |
| 5,521,922 | 5/1996 | Fujinami et al. | 370/84 |
| 5,535,137 | 7/1996 | Rosemere et al. | 364/514 A |
| 5,537,148 | 7/1996 | Fujinami | 348/473 |

*Primary Examiner*—Eddie C. Lee
*Assistant Examiner*—John Chizmar
*Attorney, Agent, or Firm*—Leydig, Voit & Mayer, Ltd.

[57] ABSTRACT

A motion-pictures and audio synchronization controller for extending and reproducing compressed motion-pictures and audio multiplexed data and outputting motion-pictures synchronously with audio comprises a selector for adjusting time between a system clock reference added to compressed motion-pictures and audio multiplexed data and picture time stamp, a system time counter for generating a system time clock output from an output of the time adjustment selector and a picture frame synchronization signal, an audio synchronization comparator for comparing a system time clock output from the system time counter with a delayed audio time stamp and outputting an audio output start signal, and a picture synchronization comparator for comparing the system time clock output from the system time counter with a delayed picture time stamp and outputting a picture output start signal. The motion-pictures and audio synchronization controller synchronizes the audio output with the motion-picture output by the audio output start signal and the picture output start signal.

6 Claims, 21 Drawing Sheets

APPARATUS FOR EXTENDING AND REPRODUCING VIDEO AND AUDIO DATA AND A VIDEO AND AUDIO SYNCHRONIZATION CONTROLLER

BACKGROUND OF THE INVENTION

1. Field of the Invention

The present invention relates to a video (motion-pictures) and audio data synchronization and synchronization controller, and an apparatus for extending and reproducing video and audio data. More particularly, the invention relates to a controller for synchronizing of video data with audio data and an apparatus for extending and reproducing a compressed video and audio multiplexed data, and outputting video data synchronous with audio data.

2. Description of the Prior Art

FIG. 19 shows a conventional apparatus for extending and reproducing video and audio data. In FIG. 19, the apparatus comprises a compressed video and audio multiplexed data 1, a video and audio dataseparator 2, a system clock reference (SCR) 3, a video and audio data synchronization controller 4, a decoded audio data 7, an output audio buffer memory 8, a decoded video data 16, an output video buffer memory 17, an audio data 24, a compressed audio data buffer memory 25, a delayed audio data 26, a delayed audio time stamp 29, an audio decoder 30, an output audio data 31, an audio output start signal 32, a video data 44, a compressed video data buffer memory 45, a delayed video data 46, a delayed video time stamp 49, a video decoder 50, a display video data 51, a video output start signal 52, and a video frame synchronization signal 54.

An operation of the conventional apparatus for extending and reproducing video and audio data is explained below. The apparatus shown in FIG. 19 is used, for example, as a receiver in video and audio communication or as a reproducing apparatus for video and audio storage medium. The compressed video and audio data multiplexed data 1 from a receiving line or from a storage medium are separated into the audio data 24 and the video data 44 by the video and audio data separator 2. Then, this video data 44 is inputted into the compressed video data buffer memory 45 which outputs the delayed video data 46. The delayed video data 46 is decoded by the video decoder 50. Both the delayed video time stamp (PTS=presentation time stamp) 49 extracted at the picture decoder 50 and the video frame synchronization signal 54 are inputted into the video and audio data synchronization controller 4. At this time, the decoded video data 16 is outputted from the video decoder 50 to the output video buffer memory 17. The output video buffer memory 17 outputs the decoded video data 16 as a display video data 51, when receiving the video output start signal 52 from the video and audio data synchronization controller 4.

On the other hand, the audio data 24 outputted from the video and audio data separator 2 are stored in the compressed audio data buffer memory 25. The delayed audio data 26 from the compressed audio data buffer memory 25 is decoded by the audio decoder 30. The decoded audio data 7 from the audio decoder 30 is inputted into an output audio buffer memory 8. The output audio buffer memory 8 outputs the decoded audio data 7 as the output audio data 31, when receiving the audio output start signal 32 from the video and audio data synchronization controller 4. The outputted audio data 31 and the display video data 51 are synchronized by the audio output start signal 32 and the video output start signal 52. The synchronization of the output audio data and the display video data is explained as follows.

FIG. 20 shows a block diagram which shows the conventional video and audio data synchronization controller 4. In FIG. 20, the controller 4 includes a system time counter 101, a system time clock (STC) 102, an audio synchronization comparator 103, and a video synchronization comparator 109.

An operation of the conventional video and audio data synchronization controller 4 is explained below. When the system clock reference (SCR) 3 is separated from the compressed-video and audio multiplexed data 1 by the video and audio data separator 2. The system clock reference (SCR) 3 periodically exists in a system bit stream layer being the compressed video and audio data 1, and indicate the absolute time from video source. The system time counter 101 receive the system clock reference (SCR) 3 and sets the count value thereof at the system clock reference (SCR) 3 for adjusting the system time clock (STC) 102 of the apparatus for extending and reproducing video and audio data. After time adjustment, the system time counter 101 counts the clock pulse of 90 kHz and increment the count value thereof and output the count value thereof as the system time clock (STC) 102 for outputting the output audio data 31 from the output audio buffer memory and the display video data 51 from the output video buffer memory. The delayed audio time stamp (PTS=presentation time stamp) 29, which is separated from the delayed audio data 26 by the audio decoder 30, is compared with the system time clock (STC) 102 at the audio synchronization comparator 103. The audio synchronization comparator 103 outputs the audio output start signal 32 to the output audio buffer memory 8, when delayed audio stamp 29 accords with the system time clock (STC) 102. The output audio buffer memory 8 outputs the output audio data 31 at the time receiving the audio output start signal 32. The audio synchronization comparator 103 regularly compares the delayed audio time stamp 29 with the system time clock (STC) 102. As the result, the output audio buffer memory outputs the output audio data 31 in synchronize with the system time clock (S T C STC) 102.

Here, a system time clock (STC) is a clock which counts the time for every 90 kHz after the time is adjusted at SCR. The video time stamp 49 indicates a decoding time stamp (DTS) and/or a presentation time stamp (PTS). The presentation time stamp (PTS) is a synchronization signal to output the head of the video frame (upper left of the display) including the PTS when STC=PTS. In other words, the presentation time stamp (PTS) denotes a signal for displaying the video frame. The decoding time stamp (DTS) denotes a synchronization signal for decoding the video data of the video frame including the DTS when STC=DTS and for starting to display I picture (inter-coded picture) or P picture (predictive -coded picture) after next I picture or P picture are decoded, and for starting to display B picture (bidirectionally predictive-coded picture) immediately after B picture are decoded, by assuming the decoding time equal to zero at the video decoder 50, so that the same effect is obtained as the above mentioned control using the presentation time stamp (PTS). Decoding time is actually finite. Assuming the delay time from the start of decoding B picture to the start of displaying the B picture is T, the decoding may be started when STC=DTS−T. The audio time stamp is defined by only a presentation time stamp (PTS) and is a synchronization signal for outputting a head of the audio frame including the PTS, when STC=PTS.

As for pictures, the video synchronization comparator 109 compares the delayed video time stamp (PTS) 49 which are separated from each video frame with the system time clock (STC) 102. The video synchronization comparator 109 outputs a video output start signal 52 in response to the video frame synchronization signal 54 appeared at the time closest (½ frame maximum) to the time when STC=PTS. The output video buffer memory 17 in response to the video output start signal 52 from the video synchronization comparator 109 outputs the display video data for displaying the video frame. Besides control method using the presentation time stamp (PTS) as the delayed video time stamp 49 as explained in the prior art, it is possible to obtain the same effects as the above prior arts by using the decoding time stamp (DTS) as the delayed video time stamp 49. In this case, the video output start signal 52 is outputted in synchronism with the video frame synchronization signal 54 at the time closest to the time when STC=DTS−T. The output video buffer memory 17 in response to the video output start signal 52 starts of decoding the decoded video data 16 of the video frame using the decoding time stamp (DTS). Here, assuming that the video frame synchronization signal 54 is able to start decoding the video data of the video frame earlier by time T for each video frame synchronization signal.

FIG. 21 is a timing chart of video data and audio data at this time. In FIG. 21, a horizontal axis indicates an actual time, while a vertical axis indicates a relation between STC and PTS. The system time counter 101 is set by the system clock reference (SCR) 3 at time t0, after then, the system time counter 101 counts for every 90 kHz. The output of the system time counter 101 is referred to as the system time clock (STC) 102. The delayed video time stamp (PTS) is given such as 103003, 106006, 109009 . . . as shown in the vertical axis, which corresponds to video frames to be displayed. However, the video frames actually displayed are different from PTS as shown in the "actual display frame" in the timing chart. As for audio data, audio frame is defined to be outputted for every decoding. The delayed video time stamp (PTS) of audio frame is given as 104500, 110500, 116500 . . . , which is outputted accurately in synchronism with the system time clock (STC). Therefore, there occurs a difference between actually the display video data 51 and the output audio data 31 to the extent that the display video data 51 is delayed.

As explained in the above prior example, the output audio data 31 is completely synchronized with the system time clock (STC). The display video data 51 is delayed from the system time clock (STC) by ½-frame in maximum. The difference between the output audio data 31 and the display video data 51 is ½-frame in maximum. The system, where both the audio data and the display video data are exactly synchronized with the system time clock (STC) for generating the video frame synchronization signal in synchronism with the display video data, has a problem that the video frame synchronization signal is lost and monitor display becomes out of order when the system time clock (STC) is changed by channel hop etc.

The present invention aims to solve the problems mentioned above. In the present invention, pictures are displayed while the video frame synchronization signal is generated continuously. At every system time clock (STC) is changed, or at the beginning of the display video data (a point of upper left of monitor, or a first field in case of interlace) in synchronism with the video frame synchronization signal after the system time clock (STC) is changed, the system time clock (STC) is adjusted again to the video time stamp (PTS). After then, the output audio data is outputted in synchronism with the system time clock (STC).

SUMMARY OF THE INVENTION

According to one aspect of the invention, an apparatus for extending and reproducing a compressed video and audio multiplexed data and outputting a display video data synchronously with an output audio data comprises a means for decoding or approximately synchronizing the display video data of the first video frame using a system time clock (STC) which is time-adjusted with the system clock reference (SRC) included in the compressed video and audio multiplexed data; a means for time adjusting an actual display start time which is quantized by a predetermined video frame synchronization signal using the system time clock in order to correct a quantization error of the first video time stamp; and a means for outputting the display video data and the output audio data in synchronism with the system time clock(STC).

According to another aspect of the invention, an apparatus for extending and reproducing a compressed video and audio data multiplexed data and outputting a display video data synchronously with an output audio data comprises a means for decoding or displaying a first video frame without using system clock reference included in the compressed video and audio multiplexed data; a means for time-adjusting a system time clock so that the system time clock is equal to a video time stamp of the first video frame at the time when a decoded video data of the first video frame starts to be decoded; and a means for outputting a display video data and the output audio data in synchronism with the system time clock.

According to further aspect of the invention, an apparatus for extending and reproducing a compressed video and audio multiplexed data and outputting a display video data synchronously with an output audio data comprises a means for separating a video data and an audio data both of which include each time stamp from the compressed video and audio multiplexed data, and storing them into respective data memory; and a means for separating each time stamp from the video data and the audio data at their respective decoding time, and for synchronizing and outputting the display video data and the output audio data.

According to further aspect of the invention, an apparatus for extending and reproducing a compressed video and audio multiplexed data and outputting a display video data synchronously with an output audio data comprises a means for separating each time stamps from the compressed video and audio multiplexed data, and storing them into the respective the data memory with time stamps; means for storing each time stamp of a video data and an audio data in respective registers; and a means for synchronizing the display video data with the output audio data, by controlling the writing addresses and the reading-out addresses of the data memories.

According to further aspect of the invention, the apparatus for extending and reproducing a compressed video and audio multiplexed data, further comprises a pre-memory audio frame counter which is placed before a audio data memory; a post memory audio frame counter which is placed behind the audio data memory; a pre-memory video frame counter which is placed before a video data memory; a post-memory video frame counter which is placed behind the video data memory.

According to further aspect of the invention, the apparatus for extending and reproducing a compressed video and audio multiplexed data comprises a register for storing an audio time stamp comprises a means for storing a audio data which have a value less than or equal to data value to be stored in a audio data memory; a register for storing a video time stamp comprise a means for storing a video data which have a value less than or equal to data value to be stored in a video data memory; and some display video data are synchronized with some other number of output audio data for every some frames without using all time stamps.

According to further aspect of the invention, an apparatus for extending and reproducing a compressed video and audio multiplexed data and outputting a display video data synchronously an output audio data, comprises means for combining the synchronization using time stamps of the video data and the audio data and the control of storage value of bit streams of the compressed video and audio multiplexed data; wherein, the control of storage value of bit streams of compressed video and audio multiplexed data is prior to the synchronization using time stamps of the and the audio data.

According to further aspect of the invention, the apparatus for extending and reproducing the compressed video and audio multiplexed data, wherein a decoding of a decoded video data of a video frame starts under the control of vbv (variable buffer verifier) delay buffer storage value if the video frame is not included in a video time stamp which is to be decoded, and synchronization is carried out when a video time stamp of a first video frame appears.

According to further aspect of the invention, an apparatus for extending and reproducing a compressed video and audio multiplexed data and outputting a display video data synchronously with an output audio data, wherein a value larger than the vbv delay buffer value threshold is used for a second video frame and subsequent frames to prevent hold of the video frames caused by operational accuracy or decoding timing jitter, during normal reproduction, after a second video frame and subsequent frames.

DETAILED DESCRIPTION OF THE PREFERRED EMBODIMENTS

Embodiment 1

Figure 1:
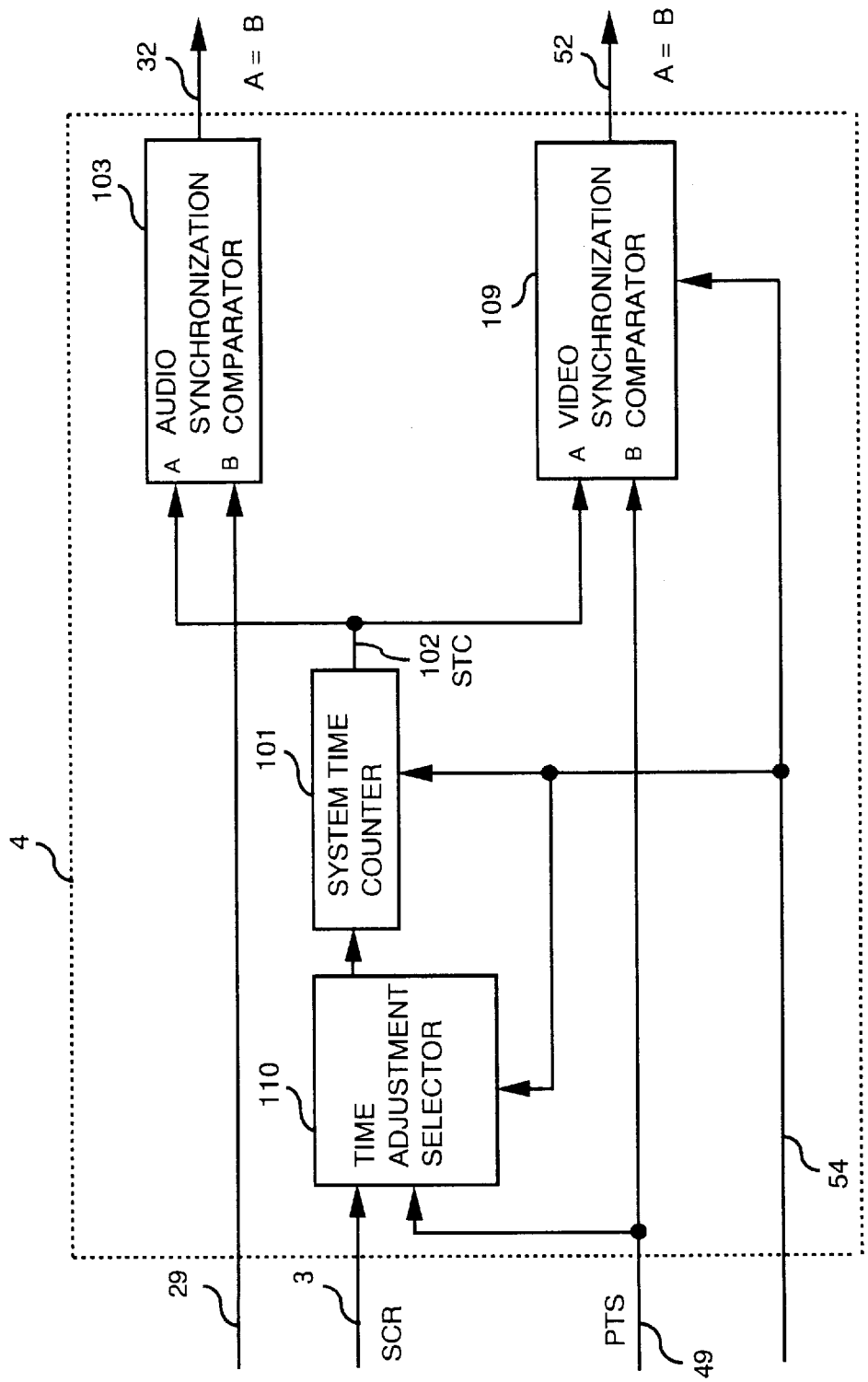
FIG. 1 shows a video and audio data synchronization controller of a first embodiment of the present invention.
Figure 2:
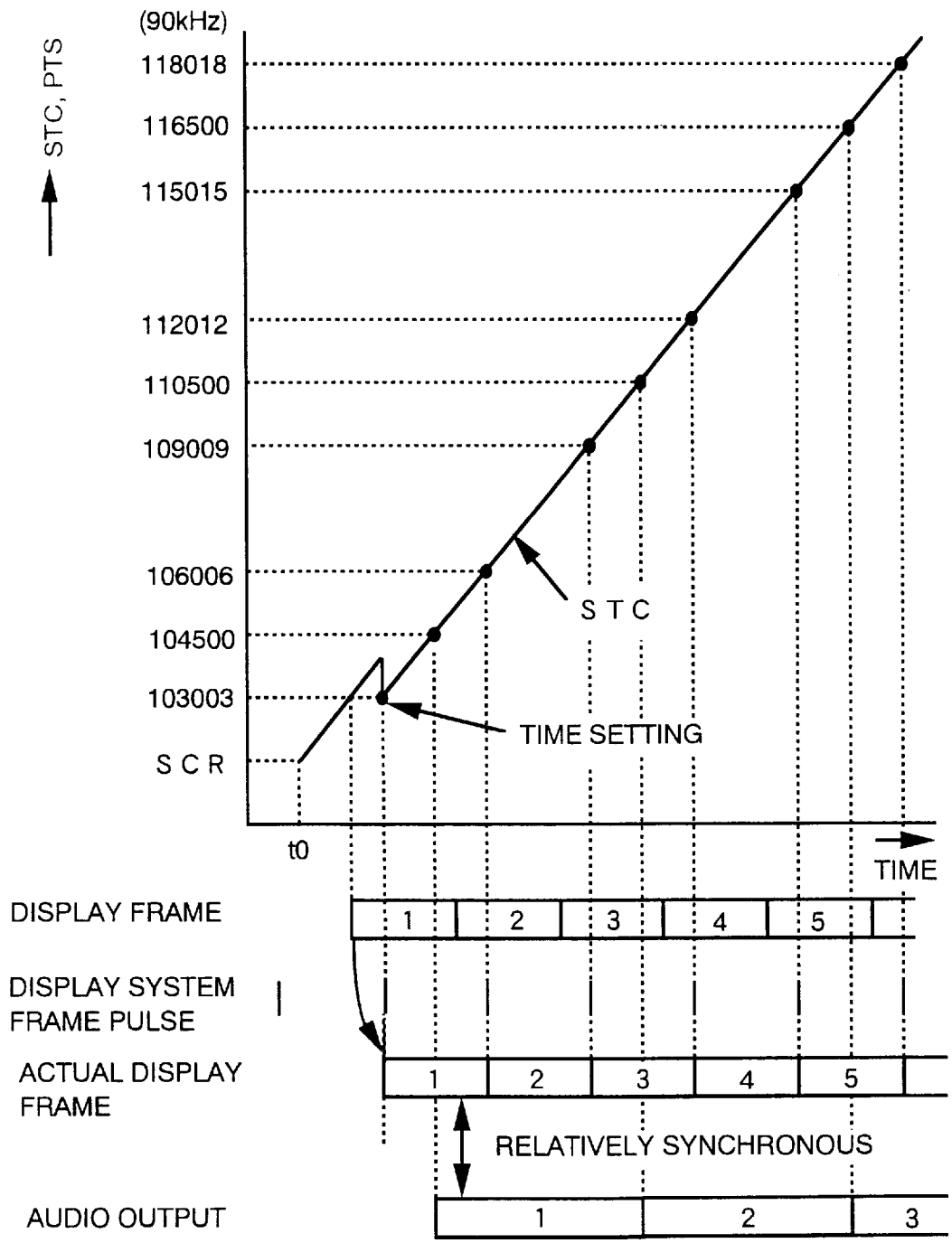
FIG. 2 shows a timing chart of video data and audio data of the first embodiment of the present invention.
Figure 4:
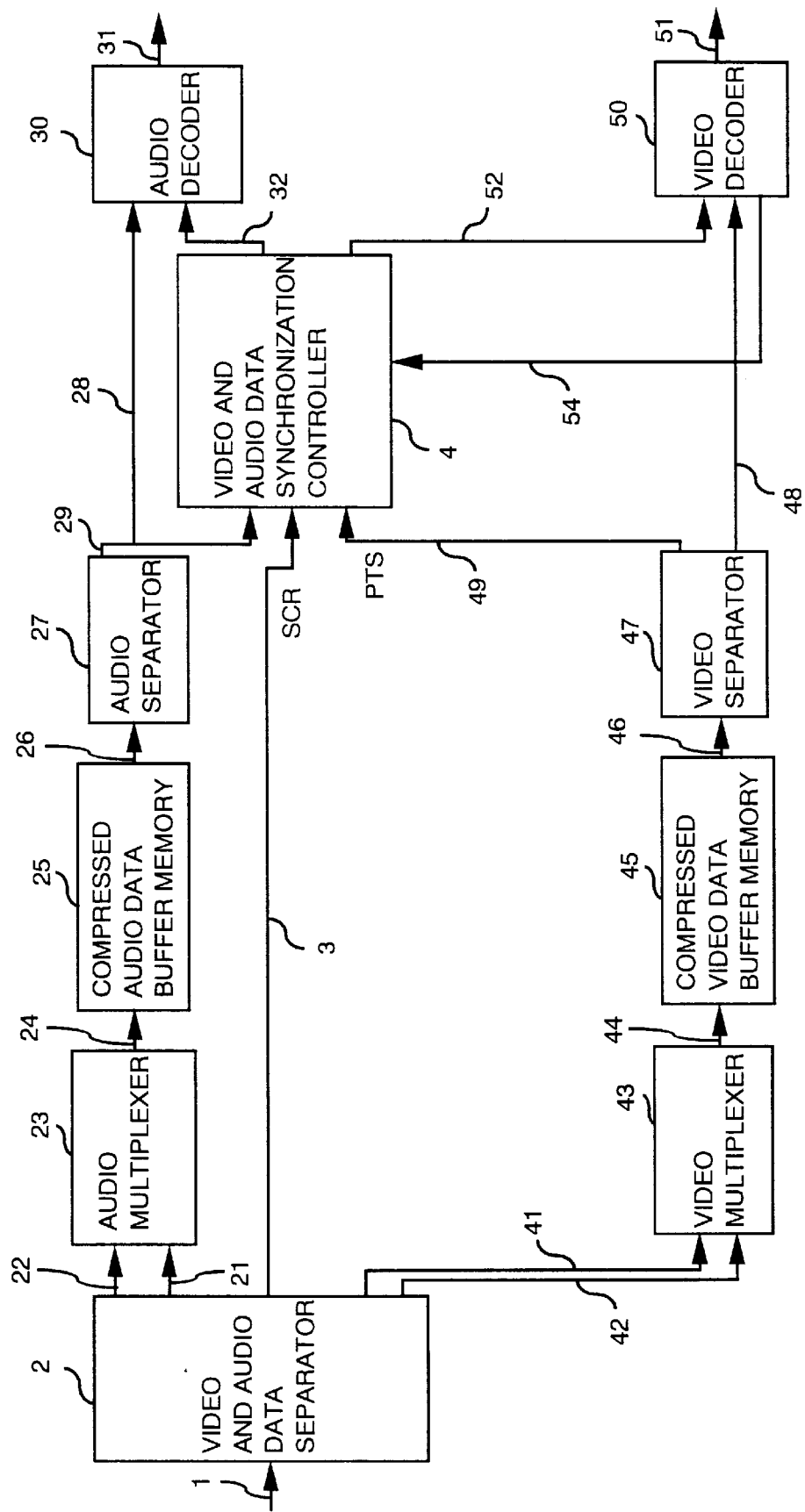
FIG. 4 shows an apparatus for extending and reproducing video data and audio data of a third embodiment of the present invention.
Figure 20:
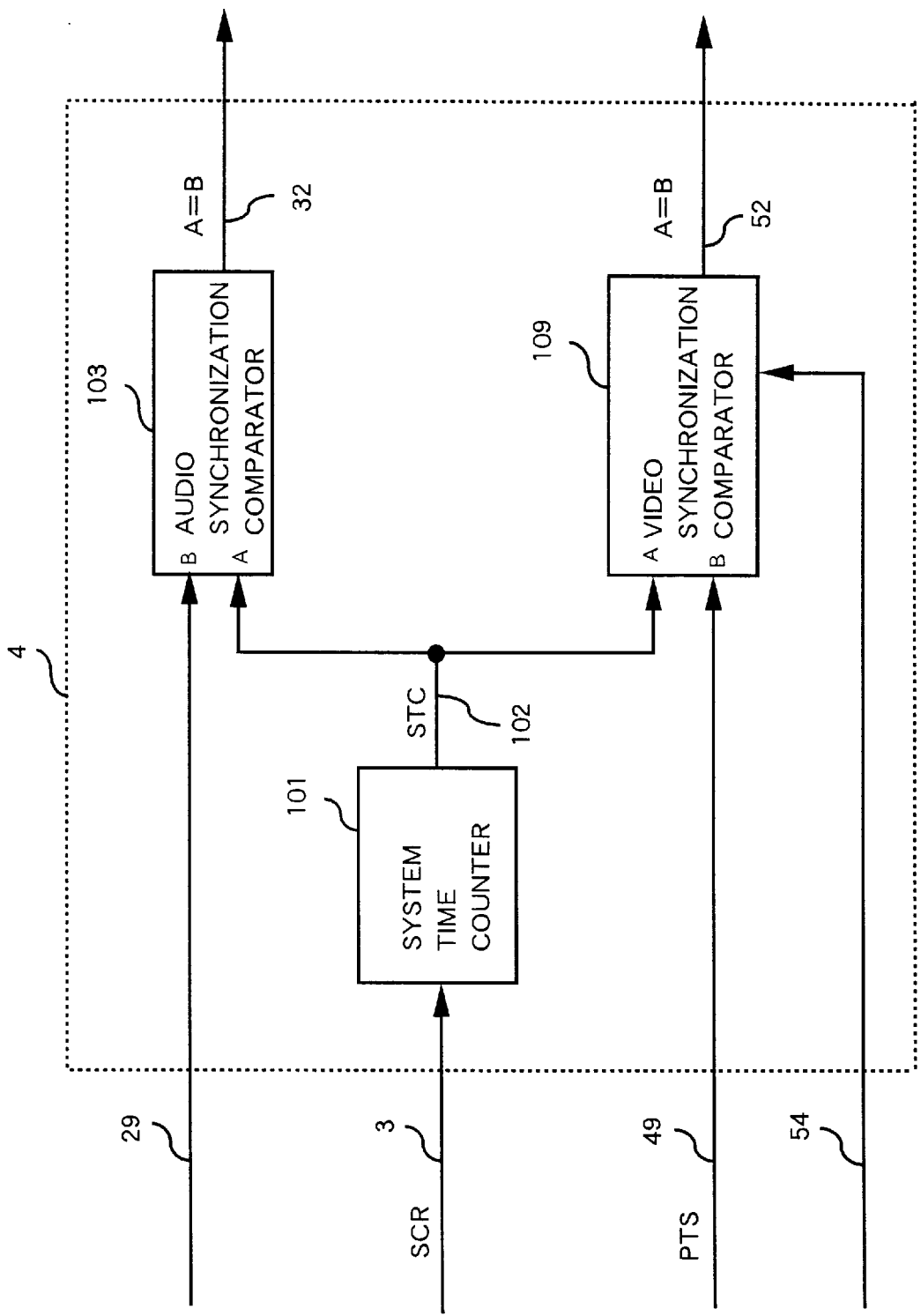
FIG. 20 shows a conventional video and audio data synchronization controller.
Figure 21:
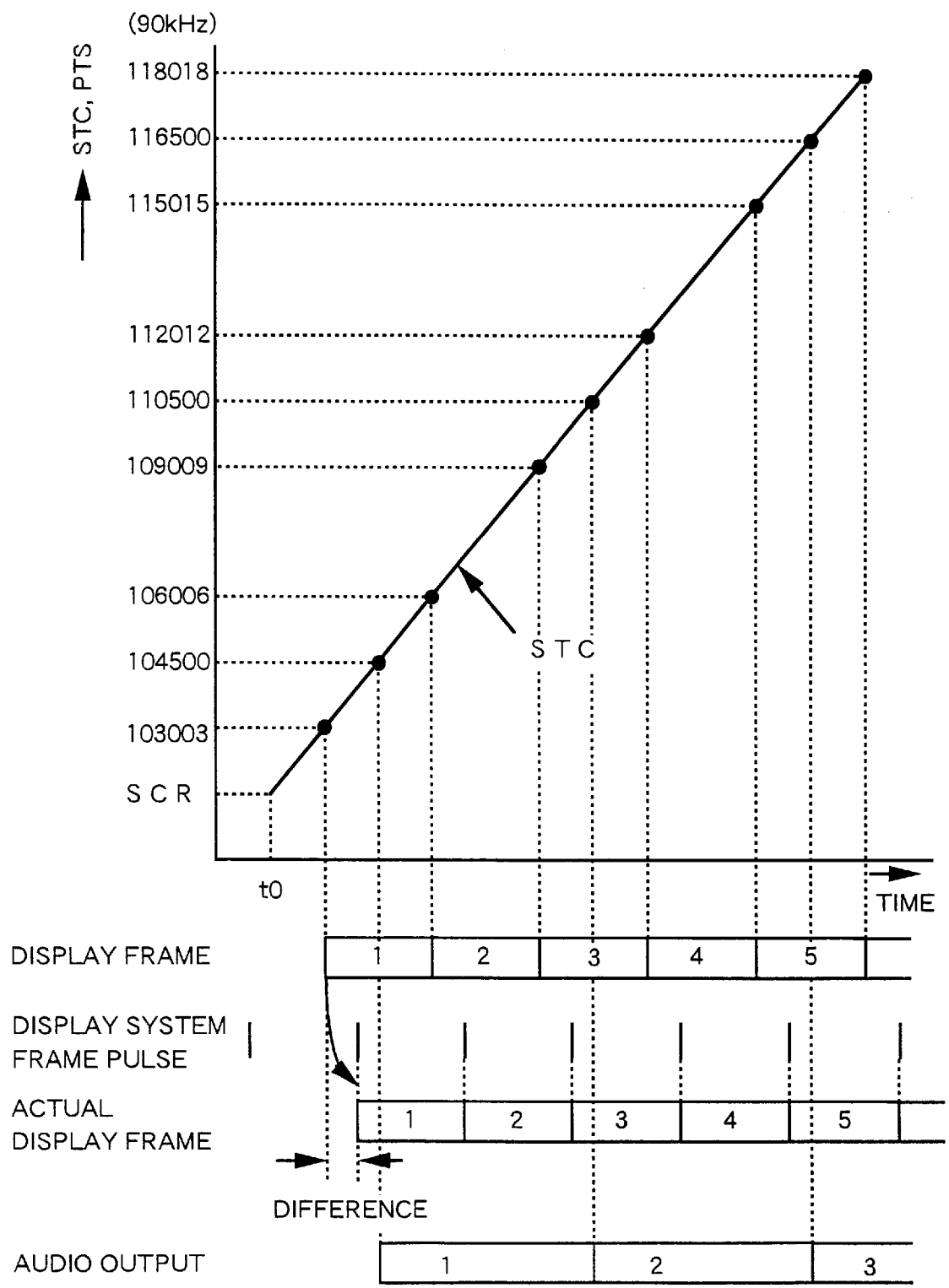
FIG. 21 shows a timing chart of video and audio data in a prior art.

FIG. 1 shows a detailed configuration of the video and audio data synchronization controller 4 of a first embodiment of the present invention illustrated in FIG. 4. In FIG. 1, the video and audio data synchronization controller 4 has a time adjustment selector 110. The elements having the same reference numbers in FIG. 1 are the same portions or the corresponding portions in FIG. 20. FIG. 2 shows a timing chart of video data and audio data in FIG. 1. In FIG. 2, a horizontal axis indicates an actual time, while a vertical axis indicates the system time clock (STC) and the video time stamp (PTS=presentation time stamp).

An operation of the controller of the first embodiment of the present invention is explained below using FIG. 1 and FIG. 2. The elements having the same reference numbers in FIG. 1 are the same portions or the corresponding portions in FIG. 20. Accordingly the detailed explanation of the same portions is omitted. Only an operation of blocks distinctive from FIG. 1 is explained as follows. In an apparatus for extending and reproducing video data and audio data of the present invention, until a first video frame is displayed, the time adjustment selector 110 selects the system clock reference (SCR) 3. The system time counter 101 receives the system clock reference (SCR) 3 from the time adjustment selector 101 and sets the count value thereof the system clock reference (SCR) 3 for adjusting the system time clock (STC) 102 of the apparatus for extending and reproducing video and audio data at time t0 by the same operation as in a prior art. After then, the system time counter 101 counts the clock pulse of 90 kHz and increment the count value thereof and output the count value thereof as the system time clock (STC) 102. At the time the first video frame is displayed (the video frame synchronization signal 54 of the first video frame), the time adjustment selector 110 selects the delayed time stamp (PTS=presentation time stamp) 49. The system time counter 101 receives the delayed video time stamp (PTS) 49 of the first video frame and sets the count value thereof at the delayed video time stamp (PTS) 49 of the first video frame for adjusting the system time clock (STC) 102. After then, the system time counter 101 counts the clock pulse of 90 kHz and increment the count value thereof and output the count value thereof as the system time clock (STC) 102.

In concrete explanation, the order of the delayed video time stamp (PTS) of the video frame is provided as 103003, 10606, 109009 . . . as shown in the prior art. Accordingly, the count value of the system time counter 101 is set in 103003, the delayed video time stamp (PTS) of each of the second video frame and subsequent video frames accords with the system time clock (STC) 102. In other words, the display video data 51 of each of the second video frame and subsequent video frames are outputted from the video decoder 50 in complete synchronization with the system time clock time clock(STC) 102. As for audio data, audio frame is defined for every decoding unit. The audio time stamp(PTS=presentation time stamp) of audio frames is provided such as 104500, 110500, 116500 . . . After setting 103003 to the system time counter 101, a start time of the output audio data 31 of a first audio frame become to 104500 of the system time clock time clock(STC). In this example, the audio decoder 30 outputs the output audio data 31 in. completely synchronize with the system time clock (STC) 102. In other words, the output audio signal 31 is synchronized relatively and completely with the display video data 51.

In the video and data audio synchronization controller 4 of the first embodiment, the system time clock (STC) is adjusted with the video time stamp (PTS) after the display video data 51 of a first video frame is outputted. In other words, the system time clock (STC) is set again to the video time stamp (PTS) of a first video frame at the beginning of output of the first video frame which is displayed in synchronism with the video frame synchronization signal 54, and after then, the output audio data 31 is outputted in synchronism with the system time clock (STC) so as to reproduce the display video data 51 completely synchronized with the output audio data 31. Here, since the output audio data 31 does not have any video frame synchronization signal 54 although the display video data 51 have, the output audio data 31 is synchronized with the system time clock (STC) without any difference.

Since the system clock reference (SCR) 3 is used in the first embodiment, it is necessary to have a circuit for detecting and separating the system clock reference (SCR) 3 in the video and audio data separator 2. In the first embodiment, the system time counter 101 is set by the system clock reference (SCR) 3. The system time counter 101 counts up and outputs the system time clock (STC) 102. Decoding of the decoded video data 48 of the first video frame is controlled to start when the delayed video time stamp (PTS) 49 of the first video frame is close to the system time clock (STC) 102. And then the system time counter 101 is set by the video time stamp (PTS) of the first video frame. The system time counter 101 counts up and outputs the system time clock (STC) 102. Decoding of the decoded video data 48 of each of the second video frame and subsequent video frames is controlled to start when the delayed video time stamp (PTS) 49 of each of the second video frame and subsequent video frames is accord with the system time clock (STC) 102. In this way, the display video data 51 are relatively and completely synchronized with the output audio data 31, and then the display video data 51 and the output audio data 31 have a small time difference from the system clock reference (SCR) 3, which is, for example, suitable for a time information system from a broadcasting station and so on.

Embodiment 2

On the other hand, in case of a reproduction system reproduced from storage medium where absolute time have no significance, it is possible to relatively and completely synchronize the display video data 51 with the output audio data 31 without using the system clock reference (SCR) 3. In such a system, the system clock reference (SCR) 3 is replaced with a delayed video time stamp (PTS=presentation time stamp) 49, which is explained in a second embodiment.

Figure 3:
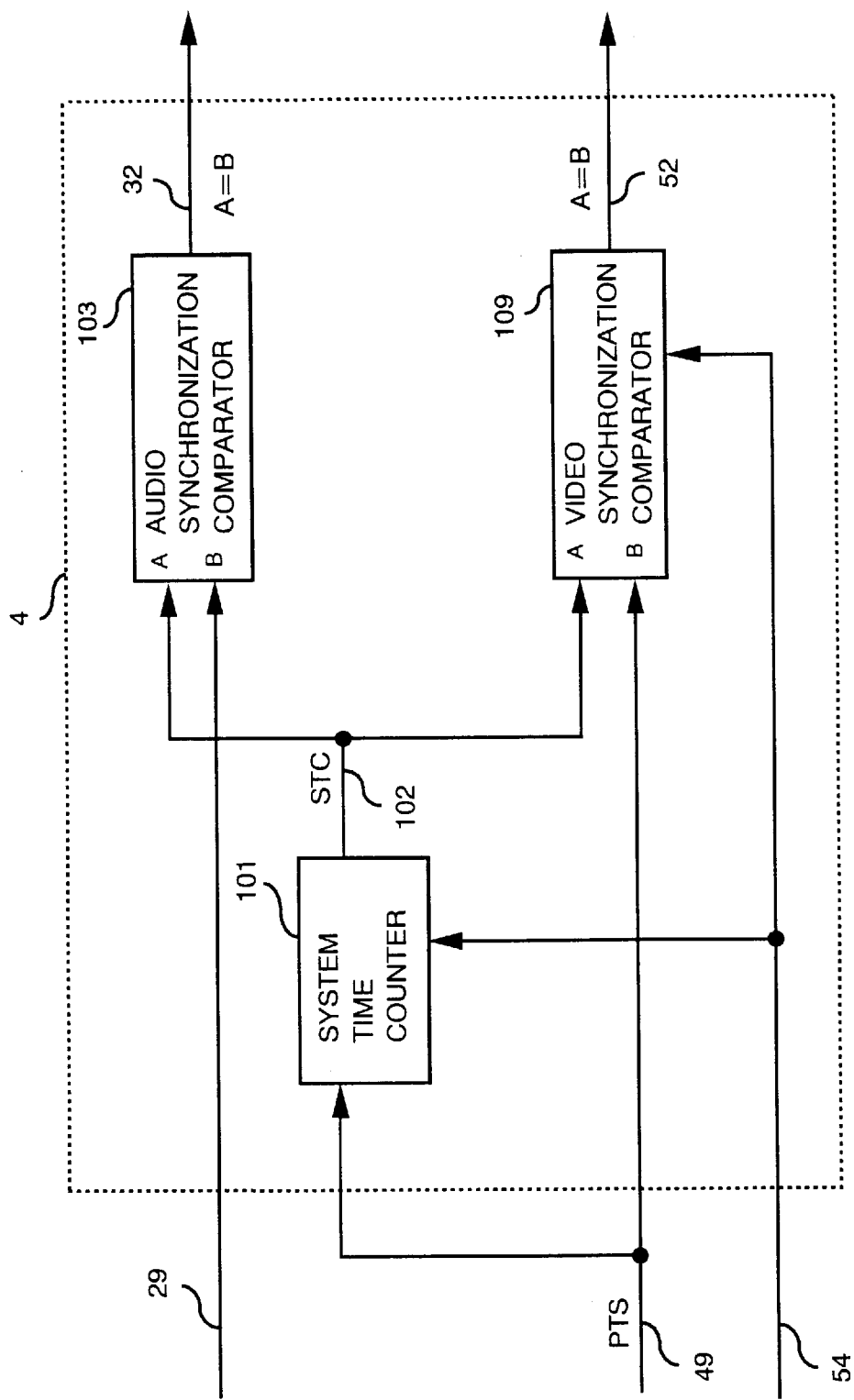
FIG. 3 shows a video and audio data synchronization controller of a second embodiment of the present invention.

FIG. 3 shows a block diagram of the video and audio data synchronization controller 4 of a second embodiment of the present invention. In FIG. 3, the video and audio data synchronization controller 4 comprises a system time counter 101, an audio synchronization comparator 103, and a video synchronization comparator 109. The elements having the same reference numbers in FIG. 3 are the same portions or the corresponding portions in FIG. 1. The delayed video time stamp (PTS) 49 is inputted into the system time counter 101 and the video synchronization comparator 109. The audio synchronization comparator 103 compares the delayed audio time stamp 29 (PTS= presentation time stamp) with the system time clock (STC) 102 which is outputted from the system time counter 101, and outputs an audio output start signal 32. The video synchronization comparator 109 compares the delayed video time stamp (PTS) 49 with the system time clock (STC) 102 under the control of the video frame synchronization signal 54, and outputs a video output start signal 52.

An operation of the video and audio data synchronization controller 4 in FIG. 3 is explained below. The elements having the same reference numbers in FIG. 3 are the same portions or the corresponding portions in FIG. 1. Accordingly the detailed explanation of the same portions is omitted. Only an operation of blocks distinctive from FIG. 1 are explained as follows. In the video and audio data synchronization controller 4 of the second embodiment, at the time when the first video frame is displayed (at receiving the video frame synchronization signal 54 of the first video frame), the system time counter 101 receives the delayed video time stamp (PTS) 49 and sets the count value thereof the delayed video time stamp (PTS) 49 for adjusting the system time clock (STC) 102 of the apparatus for extending and reproducing video and audio data. After then, the display video data 51 are controlled in the same way as explained in the first embodiment of FIG. 1. In this way, the display video data 51 is outputted from the video decoder 50 in completely synchronism with the system time clock (STC) 102. The output audio data 31 is also controlled in the same way as explained in the first embodiment of FIG. 1 after the system time counter 101 is set. In this way, an output audio data 31 is outputted in completely synchronism with the system time clock (STC) 102. Under the above control, the output audio data 31 is outputted in relatively and completely synchronism with the display video data 51.

In the second embodiment, at the time when the first video frame starts displaying, the count value of the system time counter 101 is set by the delayed video time stamp (PTS) 49 of the first video frame, without using the system clock reference (SCR) 3. In this way, in the second embodiment, a apparatus is provided in which the display video data 51 is outputted in relatively and completely synchronism with the output audio data 51, without any relation to the phase of the video frame synchronization signal 54. In the present second embodiment, since a circuit can be constructed without using the system clock reference (SCR) 3, it is advantageous not to use a circuit for detecting and separating the system clock reference (SCR) 3.

Embodiment 3

In a third embodiment, compressed data is stored before a decoded video data and a decoded audio data are decoded and corresponds to each time stamp at the input of each decoder.

FIG. 4 shows a block diagram of an apparatus for extending and reproducing video data and audio data of a third embodiment of the present invention. In FIG. 4, the apparatus comprises a compressed video and audio multiplexed data 1, a video and audio data separator 2, a system clock reference (SCR) 3, a video and audio data synchronization controller 4, a compressed audio data 21, an audio time stamp (PTS=presentation time stamp) 22, an audio multiplexer 23, an audio data 24, a compressed audio data buffer memory 25, a delayed audio data 26, an audio separator 27, a decoded audio data 28, a delayed audio time stamp (PTS) 29, an audio decoder 30, an output audio data 31, an audio output start signal 32, a compressed video data 41, a video time stamp (PTS=presentation time stamp) 42, a video multiplexer 43, a video data 44, a compressed video data buffer memory 45, a delayed video data 46, a video separator 47, a decoded video data 48, a delayed video time stamp (PTS) 49, a video decoder 50, a display video data 51, a video output start signal 52, and a video frame synchronization signal 54.

An operation of the apparatus for extending and reproducing video data and audio data of the third embodiment is explained below. The apparatus shown in FIG. 4 is used as a receiver in video and audio data communication and as a reproducing apparatus for video and audio data storage medium, for example. The compressed video and audio multiplexed data 1 from a receiving line or a storage medium are separated into the compressed video data 41 and the video time stamp 42 by the video and audio data separator 2. Then, the compressed video data 41 and the video time stamp 42 are multiplexed by the video multiplexer 43 and inputted into the compressed video data buffer memory 45. The delayed video data 46 from the compressed video data buffer memory 45 is separated into a decoded video data 48 and a delayed video time stamp (PTS) 49 by the video separator 47. The decoded video data 48 is inputted into the video decoder 50 and is decoded in response to the video output start signal 52 received from the video and audio data synchronization controller 4 and outputted as the display video data 51.

On the other hand, the compressed audio data 21 and the audio time stamp 22 outputted from the video and audio data separator 2 are multiplexed by the audio multiplexer 23 and stored in the compressed audio data buffer memory 25 as an audio data 24. The delayed audio data 26 outputted from the compressed audio data buffer memory 25 is separated to an decoded audio data 28 and a delayed audio time stamp 29 by the audio separator 27. The decoded audio data 28 is decoded by the audio decoder 30 in response to an audio output start signal 32 which is outputted from the video and audio data synchronization controller 4, and outputted as an output audio data 31.

The system clock reference (SCR) 3 separated by the video and audio data separator 2, the delayed audio time stamp 29, the delayed video time stamp (PTS) 49, and the video frame synchronization signal 54 regularly generated at the video decoder 50, are inputted into the video and audio data synchronization controller 4. The controller 4 outputs an audio output start signal 32 to the audio decoder 30 and a video output start signal 52 to the video decoder 50.

The compressed audio data 21 and the audio time stamp 22 are multiplexed by applying time stamps to the head of respective audio frames and using codes which may be separated (for example, using codes which do not appear on Huffman code table, or inserting codes in periodical positions) at the audio separator 27. The compressed video data 41 and the video time stamp 42 are also multiplexed by applying time stamps to the head of respective video frames and using codes which may be separated (for example, using codes which do not appear on Huffman code table, or inserting codes in periodical positions) at the video separator 47. In this way, the time stamp is multiplexed and separated, and particular codes are used which is able to be separated.

Figure 5:
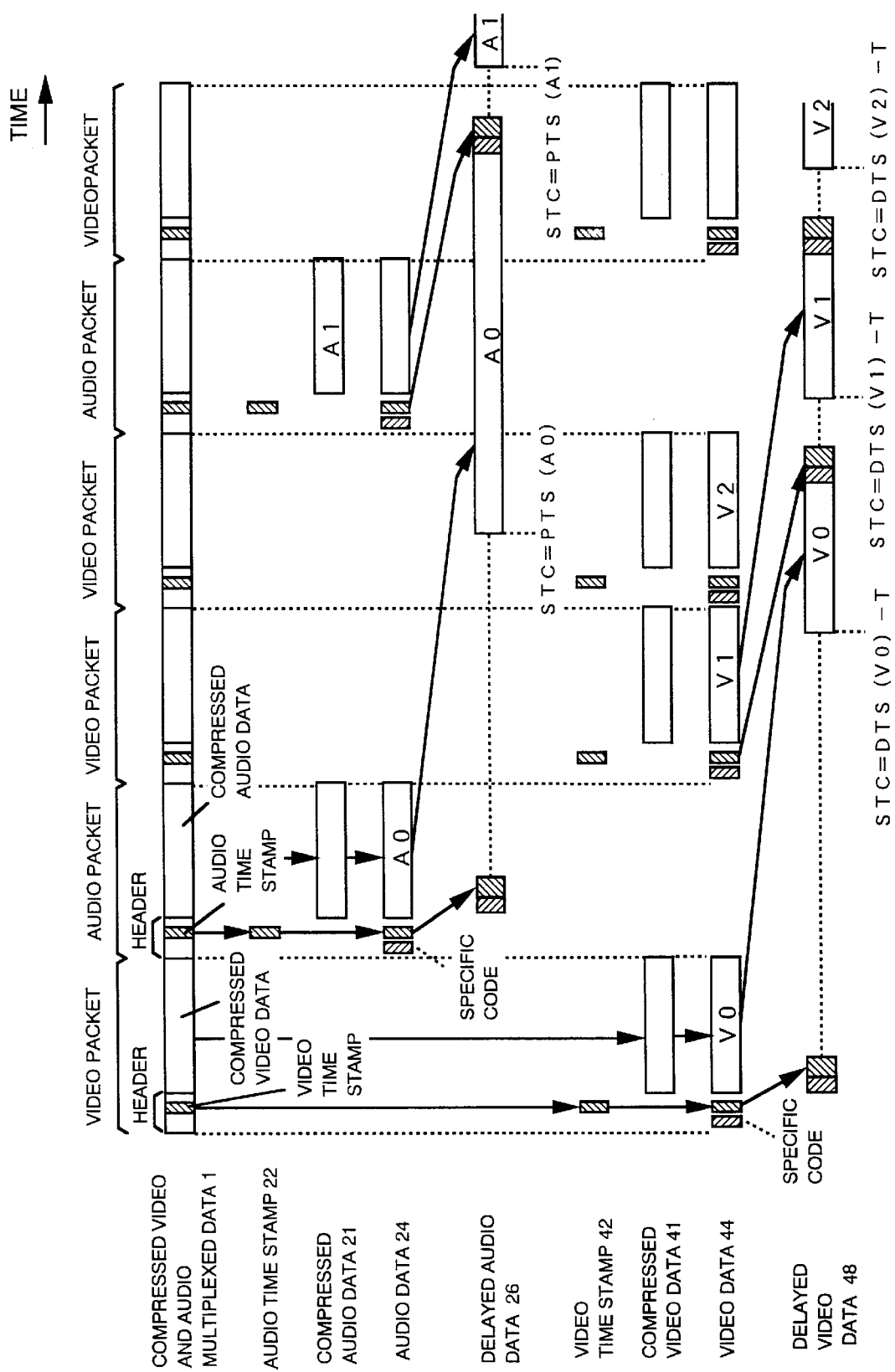
FIG. 5 shows a timing chart of an apparatus for extending and reproducing video data and audio data of the third embodiment of the present invention.

FIG. 5 shows a timing chart which shows an operation of FIG. 4. The compressed -video and audio data 1 is a data in which video packets and audio packets are multiplexed alternatively by a predetermined ratio (for example, 2:1 in FIG. 5). Each packet has a header at its head in which time stamps such as a presentation time stamp (PTS) and a decoding time stamp (DTS) are written. As for video data, the video time stamp 42 and the compressed video data 41 are separated from the compressed video and audio multiplexed data 1, and the other data in the headers are discard. The video time stamp 42 and the compressed video data 41 are multiplexed again and delayed by the compressed video data buffer memory 45, where particular codes are added into the multiplexed data so that the time stamps can be separated from the video time stamp 42 and the compressed video data 41 later.

The video separator 47 separates the delayed video time stamp (DTS) 48 of each video frame Vn from the delayed video data 46 which are received from the compressed video data buffer memory 45. The delayed time stamp DTS (V0) of the video frame zero is read from the compressed video data buffer memory 45 immediately after the delayed time stamp DTS (V0) is written in the compressed video data buffer memory 45, and separated by the video separator 47. The delayed time stamp DTS (Vn) of the second frame and the subsequent frames read from the compressed video data buffer memory 45 at the time the video data of the preceding video frame is finished to decode and separated by the video separator 47. The decoded video data 48 of n-th video frame starts to decode by the video decoder 50 when STC=DTS (n)−T. The above manner is applied to the decoded audio data 28 as well, where the audio decoder 30 starts to decode and output the n-th frame at the time when STC=PTS (An). Where, an audio time stamp of each frame An is PTS (An), and delay due to decoding of audio data is neglected.

When the compressed video data 41 are decoded, the compressed video data 41 is delayed in synchronism with the video time stamp 42. When the compressed audio data 21 are decoded, the compressed audio data 21 is delayed in synchronism with the audio time stamp 22. In the present invention, the decoded audio data 28 is synchronized with the audio output start signal 32 (namely, the delayed audio time stamp 29) at the audio decoder 30, while the decoded video data 48 is synchronized with the video output start signal 52 (namely, the delayed video time stamp 49) at the video decoder 50. Therefore, the display video data 51 are synchronized with the output audio data 31 outputted from the apparatus for extending and reproducing video and audio data of the present invention.

Embodiment 4

In a fourth embodiment, writing address of the head of each frame is stored when inputting the data into the compressed data buffer memory. The writing address is delayed corresponding to the time stamp. In case that the reading-out address is equal to the writing address, corresponding time stamp is read-out when outputting data out of the compressed data buffer memory.

Figure 6:
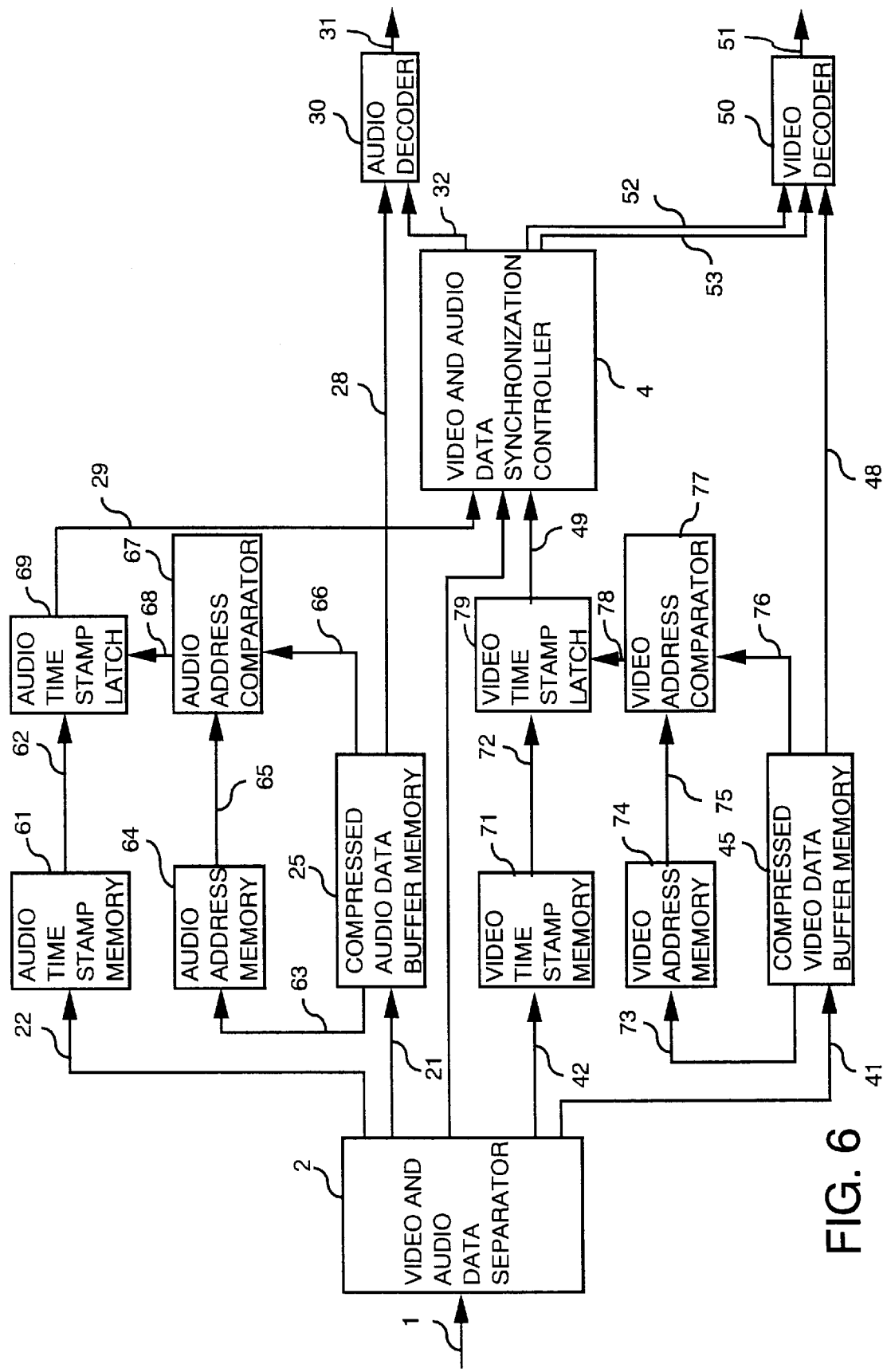
FIG. 6 shows an apparatus for extending and reproducing video data and audio data of a fourth embodiment of the present invention.

FIG. 6 shows a block diagram which shows an apparatus for extending and reproducing video and audio data of a fourth embodiment of the present invention. In FIG. 6, the apparatus includes an audio time stamp memory 61, an audio time stamp memory output 62, an audio writing address 63, an audio address memory 64, a delayed audio writing address 65, an audio reading-out address 66, an audio address comparator 67, an audio time stamp latch signal 68, and an audio time stamp latch 69.

The apparatus also includes a video time stamp memory 71, a video time stamp memory output 72, a video writing address 73, a video address memory 74, a delayed video writing address 75, a video reading-out address 76, a video address comparator 77, a video time stamp latch signal 78, and a video time stamp latch 79. The elements having the same reference numbers in FIG. 6 are the same portions or the corresponding portions in FIG. 4. Accordingly the detailed explanation of the same portions is omitted.

An operation of the apparatus of the fourth embodiment is explained below using FIG. 6. The audio time stamp (PTS) 22 is stored in the audio time stamp memory 61 and delayed thereby. When the compressed audio data 21 is written in the compressed audio data buffer memory 25, the audio writing address 63 at the head of the audio frame is stored in the audio address memory 64. The audio address comparator 67 compares the audio reading-out address 66 with the delayed audio writing address 65 from the audio address memory 64 at the same time when reading out the decoded audio data 28. When the audio reading-out address 66 accords with the delayed audio writing address 65, the audio address comparator 67 outputs the audio time stamp latch signal 68 to the audio time stamp latch 69 which latches the output 62 from the audio time stamp memory 61 to obtain a delayed audio time stamp (PTS) 29. At this time, the delayed audio time stamp (PTS) 29 can be synchronized with the decoded audio data 28 by synchronizing the reading of the audio time stamp memory 61 with that of the audio address memory 64.

On the other hand, the video time stamp (PTS and/or DTS) 42 is stored and delayed in the video time stamp memory 71. When the compressed video data 41 is written in the compressed video data buffer memory 45, the video writing address 73 at the head of the video frame is stored in the video address memory 74. The video address comparator 77 compares the video reading-out address 76 with the delayed video writing address 75 at the same time when reading out the decoded video data 48. When the video reading-out address 76 accords with the delayed video writing address 75 from the video address memory 74, the video address comparator 77 outputs the video time stamp latch signal 78 to the video time stamp latch 79 which latches the output 72 from the video time stamp memory 71 to obtain a delayed video time stamp (PTS and/or DTS) 49. At this time, the delayed video time stamp 49 can be synchronized with the decoded video data 48 by synchronizing the reading of the video time stamp memory 71 with that of the video address memory 74.

Figure 7:
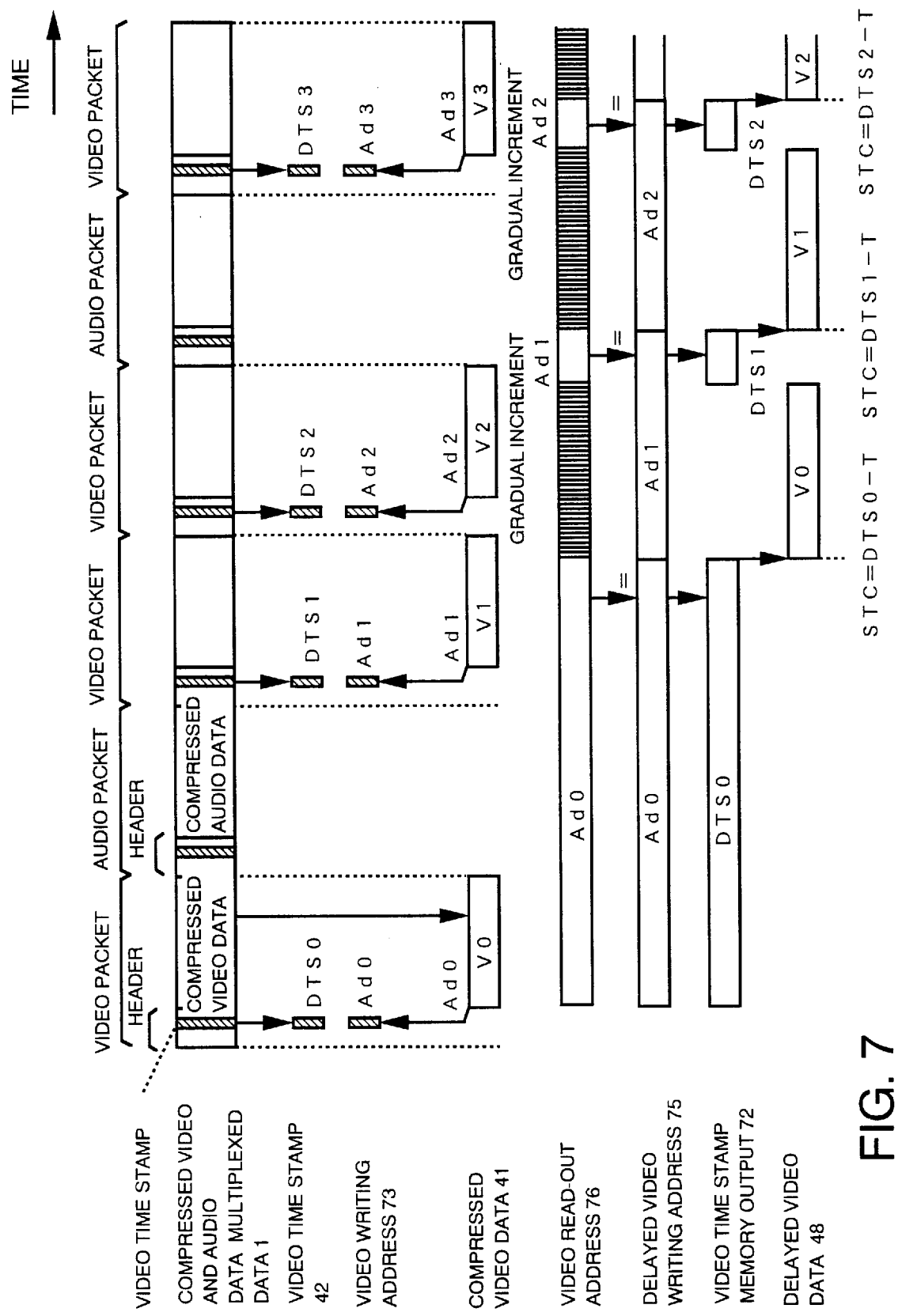
FIG. 7 shows a timing chart of an apparatus for extending and reproducing video data and audio data of the fourth embodiment of the present invention.

FIG. 7 shows a timing chart which shows an operation of FIG. 6. In the following, only the operation of the video data is explained, because the operation of audio data is the same as that of the video data. Writing addresses Ad0, Ad1, Ad2 . . . of the video writing address 73, which are obtained when respective video frames V0, V1, V2 . . . of the compressed video data 41 are going to be written in the compressed video data buffer memory 45, are delayed in the video address memory 74 to obtain a delayed video writing address 75. The video time stamps DTS0, DTS1, DTS2 . . . of the video time stamp 42 are also delayed in the video time stamp memory 71 to obtain the video time stamp memory output 72. Since the video reading-out address 76 is expressed as Ad (n) and is equal to the delayed video writing address 75, before n-th frame of delayed video data 48 are read out, DTS (n) is read out as the video time stamp memory output 72. When the system time clock (STC) becomes equal to DTS (n)–T, the video decoder 50 starts to decode the decoded video data 48 of n-th video frame. When the decoding of the decoded video data 48 of n-th video frame is finished, a video reading-out address 76 becomes Ad (n+1).

According to the fourth embodiment, time stamps can be delayed without multiplexing nor separating the time stamps. In the fourth embodiment, the compressed video data 41 is delayed in synchronism with the video time stamp 42 when the decoded video data 48 are decoded, while the compressed audio data 21 is delayed in synchronism with the audio time stamp 22 when the decoded audio data 28 are decoded, in the same manner as the third embodiment.

According to the fourth embodiment, the decoded audio data 28 are synchronized with the delayed audio time stamp 29 at the audio decoder 30, while the decoded video data 48 are synchronized with the delayed video time stamp (PTS and/or DTS) 49 at the video decoder 50. Therefore, the output audio data 31 is synchronized with the display video data 51 in the apparatus for extending and reproducing video and audio data of the fourth embodiment.

Embodiment 5

An apparatus for extending and reproducing video and audio of the fifth embodiment has frame counters before and after each compressed data memory, where frame number is delayed in stead of address.

Figure 8:
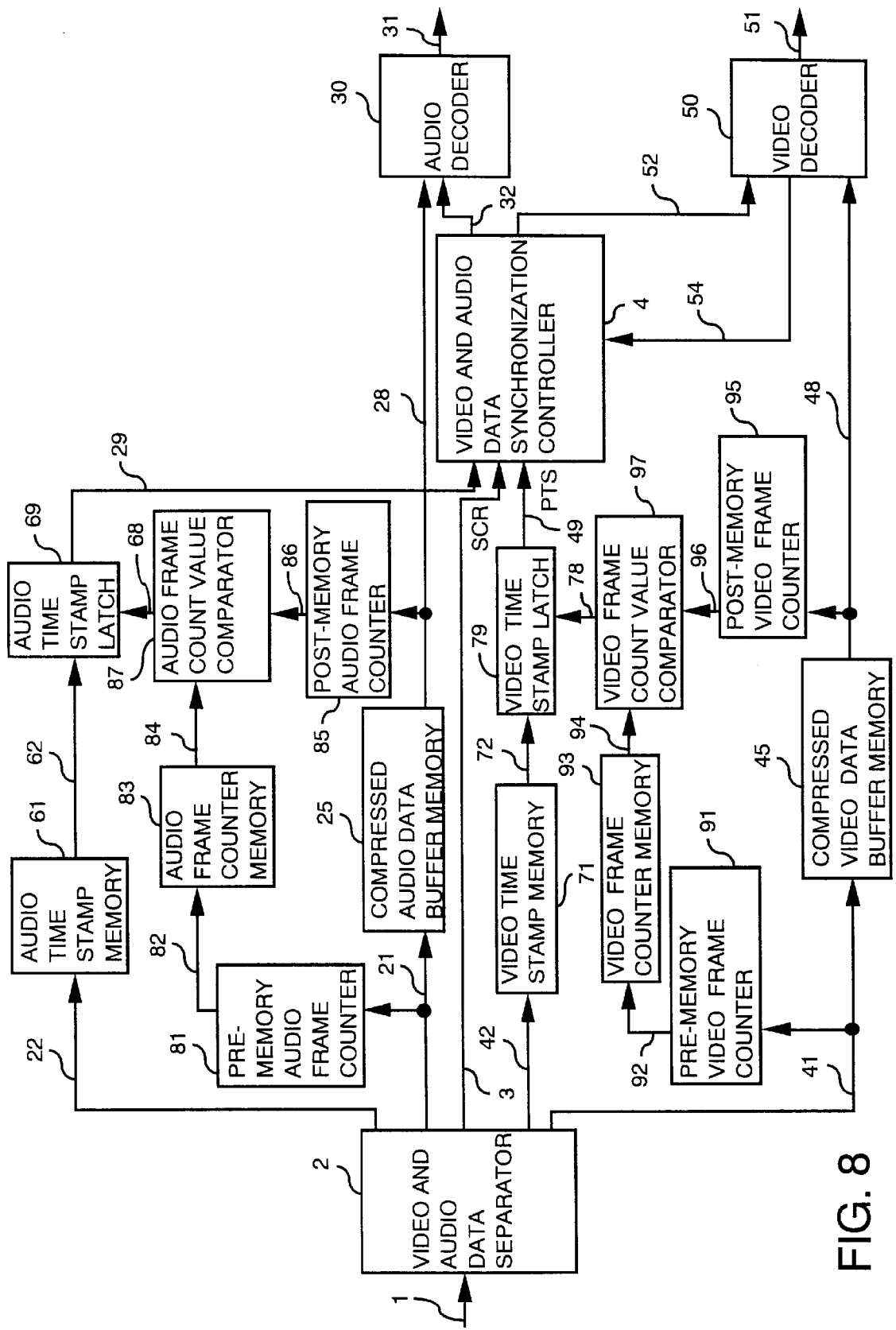
FIG. 8 shows an apparatus for extending and reproducing video data and audio data of a fifth embodiment of the present invention.

FIG. 8 shows a block diagram which shows an apparatus for extending and reproducing video and audio data of the fifth embodiment. In FIG. 8, the apparatus comprises a pre-memory audio frame counter 81 which is located before the compressed audio data buffer memory 25, a pre-memory audio frame count value 82, an audio frame counter memory 83, a delayed audio frame count value 84, a post memory audio frame counter 85 which is located after memory, a post-memory audio frame count value 86, an audio frame count value comparator 87. The apparatus further comprises a pre-memory video frame counter 91 which is located before the memory, a pre-memory video frame count value 92, a video frame counter memory 93, a delayed video frame count value 94, a post-memory video frame counter 95 which is located after memory, a post-memory video frame count value 96, and a video frame count value comparator 97. The elements having the same reference numbers in FIG. 8 are the same portions or the corresponding portions in FIG. 4 and FIG. 6. Accordingly the detailed explanation of the same portions is omitted.

An operation of the apparatus of the fifth embodiment is explained below using FIG. 8. The audio time stamp (PTS) 22 is stored and delayed in the audio time stamp memory 61. When the compressed audio data 21 is written in the compressed audio data buffer memory 25, the pre-memory audio frame counter 81 detects and counts frame headers of the compressed audio data 21. Then, the pre-memory audio frame count value 82 is stored in the audio frame counter memory 83. When the decoded audio data 28 is read out, the post-memory audio frame counter 85 detects and counts frame headers of the decoded audio data 28. The audio frame count value comparator 87 compares the post-memory audio frame count value 86 with the delayed audio frame count value 84 outputted from the audio frame counter memory 83. When the post-memory audio frame count value 86 accords with the delayed audio frame count value 84, the audio frame count value comparator 87 outputs an audio time stamp latch signal 68 to the audio time stamp latch 69, and the audio time stamp memory output 62 is latched to obtain a delayed audio time stamp 29.

The count value 82 of the pre-memory audio frame counter 81 becomes equal to that of the post-memory audio frame counter 85 in case that the maximum value (32 frames, for instance) of audio frames are stored in the compressed audio data buffer memory 25. The next number of the maximum value returns to zero again. It is assumed that the respective counters are reset to be zero at the beginning of the operation.

On the other hand, the video time stamp (PTS and/or DTS) 42 is stored and delayed in the video time stamp memory 71. When the compressed video data 41 is written in the compressed video data buffer memory 45, the pre-memory video frame counter 91 detects and counts frame headers of the compressed video data. The pre-memory video frame count value 92 is stored in the video frame counter memory 93. When the decoded video data 48 is read out, the post-memory video frame counter 95 detects and counts frame headers of the decoded video data 48. The video frame count value comparator 97 compares the post memory video frame count value 96 with the delayed video frame count value 94 outputted from the video frame counter memory 93. When the post-memory video frame count value 96 accords with the delayed video frame count value 94, the video frame count value comparator 97 outputs a video time stamp latch signal 78 to the video time stamp latch 79, and the video time stamp memory output 72 is latched to obtain a delayed video time stamp (PTS and/or DTS) 49.

According to the present embodiment, the compressed video data 41 is delayed in synchronism with the video time stamp 42 when the decoded video data 48 is decoded, while the compressed audio data 21 is delayed in synchronism with the audio time stamp 22 when the decoded audio data 28 is decoded, in the same manner as the third embodiment. The decoded audio data 28 is synchronized with the delayed audio time stamp 29 at the audio decoder 30, while the decoded video data 48 is synchronized with the delayed video time stamp (PTS and/or DTS) 49 at the video decoder 50. Therefore, the output audio data 31 is synchronized with the display video data 51 in the apparatus for extending and reproducing video and audio data.

Figure 9:
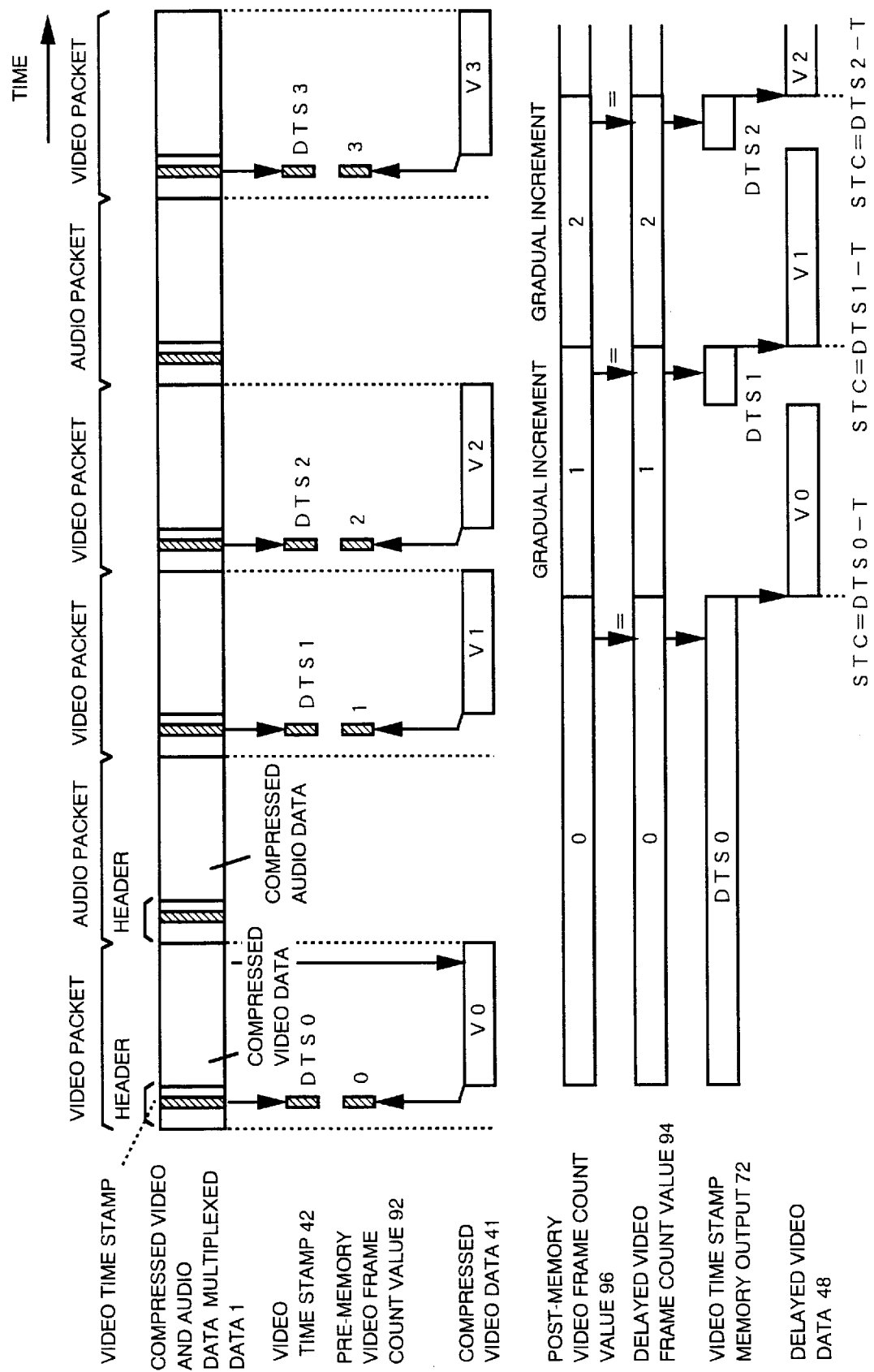
FIG. 9 shows a timing chart of an apparatus for extending and reproducing video data and audio data of the fifth embodiment of the present invention.

FIG. 9 is a timing chart which shows an operation of FIG. 8. Writing addresses 0, 1, 2 . . . of the pre-memory video frame count value 92, which are obtained when respective video frames V0, V1, V2 . . . of the compressed video data 41 are going to be written in the compressed video data buffer memory 45, are delayed in the video frame counter memory 93 to obtain a delayed video frame count value 94. The video time stamps DTS0, DTS1, DTS2 . . . of the video time stamp 42 are also delayed in the video time stamp memory 71 to obtain the video time stamp memory output 72. Since the post-memory video frame count value 96 is equal to the delayed video frame count value 94, DTS (n) is read out as the video time stamp memory output 72. When the system time clock (STC) becomes equal to DTS (n)–T, the video decoder 50 starts to decode the decoded video data of n-th video frame. When the decoding of the decoded video data of the video frame is finished, the post-memory video frame count value 96 is incremented by+1.

According to the fifth embodiment, the number of bits of audio frame counter memory 83 and video frame counter memory 93 can be decreased. Furthermore, it is possible to carry out the control slowly for every frame unit.

Embodiment 6

In a sixth embodiment, it is not necessary to control an operation for every frame unit using all time stamps in order to synchronize the audio data with the video data. An apparatus for extending and reproducing video and audio data of the present embodiment can synchronize the audio data with the video data for several frames.

Figure 10:
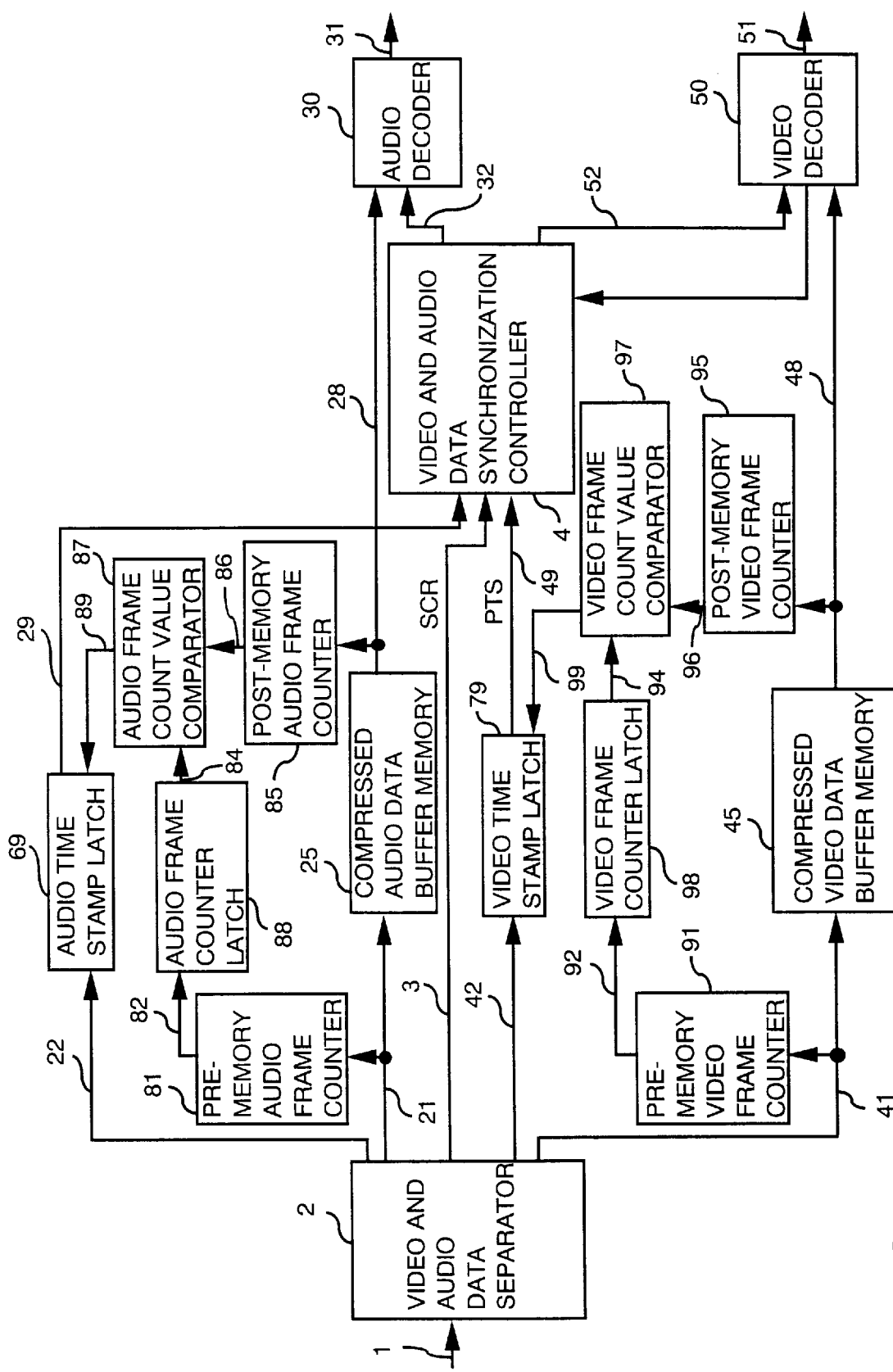
FIG. 10 shows an apparatus for extending and reproducing video data and audio data of a sixth embodiment of the present invention.

FIG. 10 shows a block diagram of an apparatus for extending and reproducing video and audio data of the present sixth embodiment. In FIG. 10, the apparatus comprises an audio frame counter latch 88, an audio time stamp valid signal 89, a video frame counter latch 98, and a video time stamp valid signal 99. The elements having the same reference numbers in FIG. 10 are the same portions or the corresponding portions in FIG. 8. Accordingly the detailed explanation of the same portions is omitted.

An operation of the apparatus for extending and reproducing video and audio data of the sixth embodiment is explained below using FIG. 10. The sixth embodiment of FIG. 10 is different from the fifth embodiment of FIG. 8 in that the audio time stamp memory 61 is replaced with the audio time stamp latch 69, the audio frame counter memory 83 with the audio frame counter latch 88, the video time stamp memory 71 with the video time stamp latch 79, the video frame counter memory 93 with the video frame counter latch 98. When the compressed audio data 21 is written in the compressed audio data buffer memory 25, the pre-memory audio frame counter 81 detects and counts frame headers of the compressed audio data. Then the counted pre memory audio frame count value 82 is latched in the audio frame counter latch 88. At the same time, the audio time stamp (PTS) 22 is latched in the audio time stamp latch 69.

When the decoded audio data 28 is read out, the post-memory audio frame counter 85 detects and counts frame headers of the decoded audio data 28. The audio frame count value comparator 87 compares the post-memory audio frame count value 86 with the delayed audio frame count value 84 outputted from the audio frame counter latch 88. When the post-memory audio frame count value 86 accords with the delayed audio frame count value 84, the audio frame count value comparator 87 outputs the audio time stamp valid signal 89 to use it as a delayed audio time stamp (PTS) 29. Until the post memory audio frame count value 86 accords with the delayed audio frame count value 84, the audio time stamp (PTS) 22 is latched in the audio time stamp latch 69 without being updated, and the pre-memory audio frame count value 82 is latched in the audio frame counter latch 88 without being updated. When the post-memory audio frame count value 86 accords with the delayed audio frame count value 84, audio synchronization is carried out to perform the next latch operation.

Next, when the compressed video data 41 is written into the compressed video data buffer memory 45, the pre-memory video frame counter 91 detects and counts the frame headers of the compressed video data. The counted the pre-memory video frame count value 92 is latched in the video frame counter latch 98. At the same time, the video time stamp (PTS and/or DTS) 42 is latched at the video time stamp latch 79. When the decoded video data 48 is read out, the post-memory video frame counter 95 detects and counts the frame headers of the compressed video data. The video frame count value comparator 97 compares the counted the post-memory video frame count value 96 with the delayed video frame count value 94 outputted from the video frame counter latch 98. When the post-memory video frame count value 96 accords with the delayed video frame count value 94, the video time stamp valid signal 99 is outputted, which is used as a delayed video time stamp (PTS and/or DTS) 49. Until the post memory video frame count value 96 accords with the delayed video frame count value 94, the video time stamp (PTS and/or DTS) 42 is latched into the video time stamp latch 79 without being updated, and the pre-memory video frame count value 92 is latched in the video frame counter latch 98 without being updated. When the post-memory video frame count value 96 accords with the delayed video frame count value 94, video synchronization is carried out to perform the next latch operation.

Figure 11:
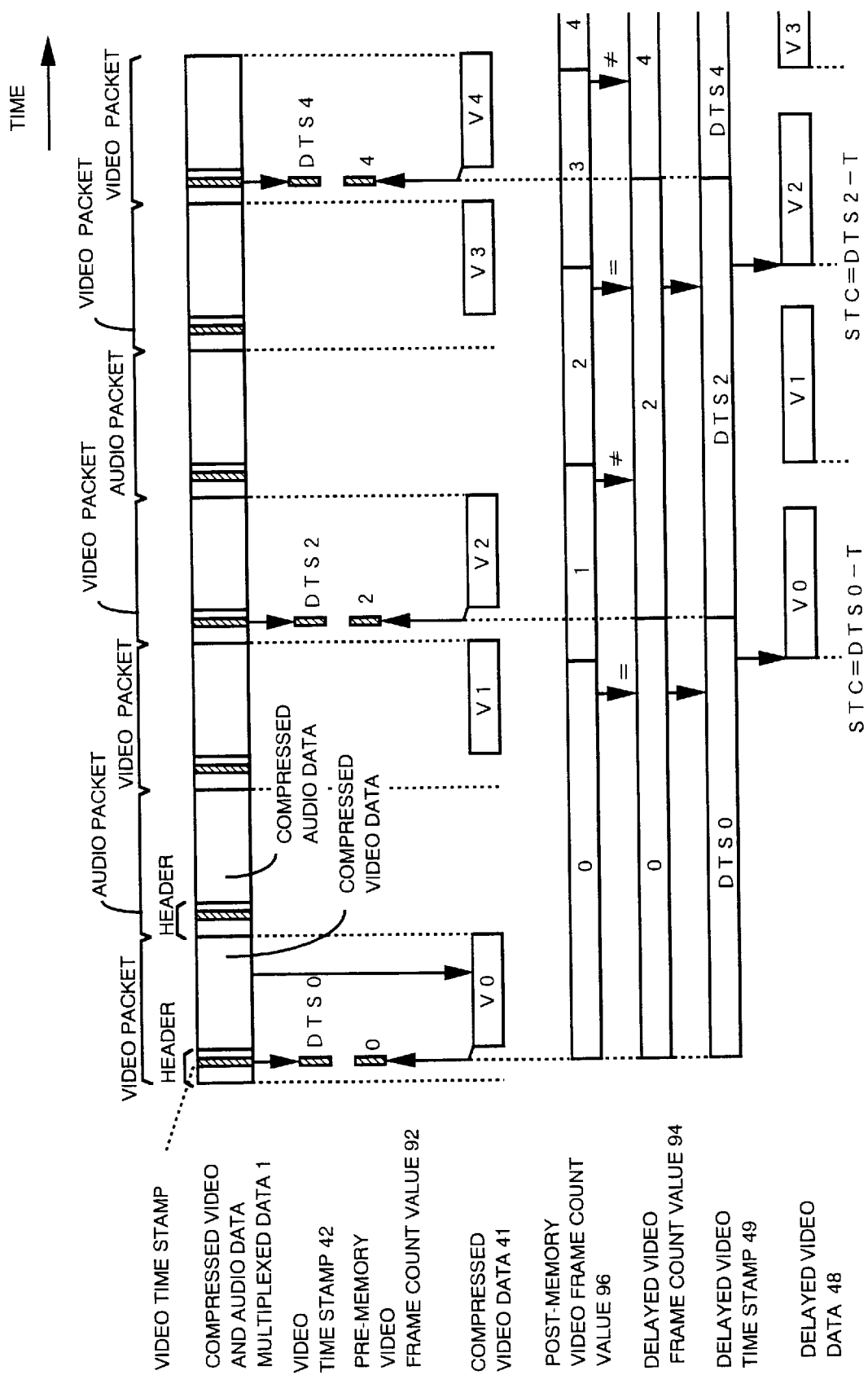
FIG. 11 shows a timing chart of an apparatus for extending and reproducing video data and of the sixth embodiment of the present invention.

FIG. 11 is a timing chart which shows an operation of FIG. 10. In the following, only the operation of the video data is explained, because the operation of audio data is the same as that of the video data. The value 0 of the pre-memory video frame count value 92 which is obtained when a video frame V0 of the compressed video data 41 is going to be written in the compressed video data buffer memory 45, is latched and delayed to obtain a delayed video frame count value 94. The video time stamps DTS0 of the video time stamp 42 is also latched and delayed in the video time stamp latch 79 to obtain the delayed video time stamp (PTS) 49. Since the post-memory video frame count value 96 is equal to the delayed video frame count value 94, DTS (0) is valid. When the system time stamp (STC) becomes equal to DTS (0)–T, the video decoder 50 starts to decode the decoded video data 48 of 0-th frame.

At this stage, the video time stamp latch 79 and the video frame counter latch 98 repeats to latch the video time stamp of the next new video frame, but since the first video frame of the complexed video and audio multiplexed data 1 has already passed, the same process is repeated to the second video frame. Every time when the decoded data 48 of the video frame is decoded, the post-memory video frame count value 96 is incremented by +1. When the post-memory video frame count value 96 is 1 and the delayed video frame count value 94 is 2, no synchronization operation is carried out. When the post memory video frame count value 96 becomes 2, the video decoder 50 starts to decode the decoded video data 48 of the second video frame if the system time stamp (STC) becomes equal to DTS (2)–T.

The apparatus of the sixth embodiment has advantage of simple construction, since the circuit can be constructed by a latch of one data length instead of a video and audio time stamp memory, and an address memory or a frame counter memory, respectively.

Embodiment 7

Although the video data are synchronized with the audio data using time stamps, the synchronization can not be carried out or system hangs up sometimes during the operation, due to the hardware limitation such as full or empty of compressed audio data buffer memory or video data. In the seventh embodiment, the system is constructed such that the limitation due to hardware is prior to a control of synchronization of using time stamps.

Figure 12:
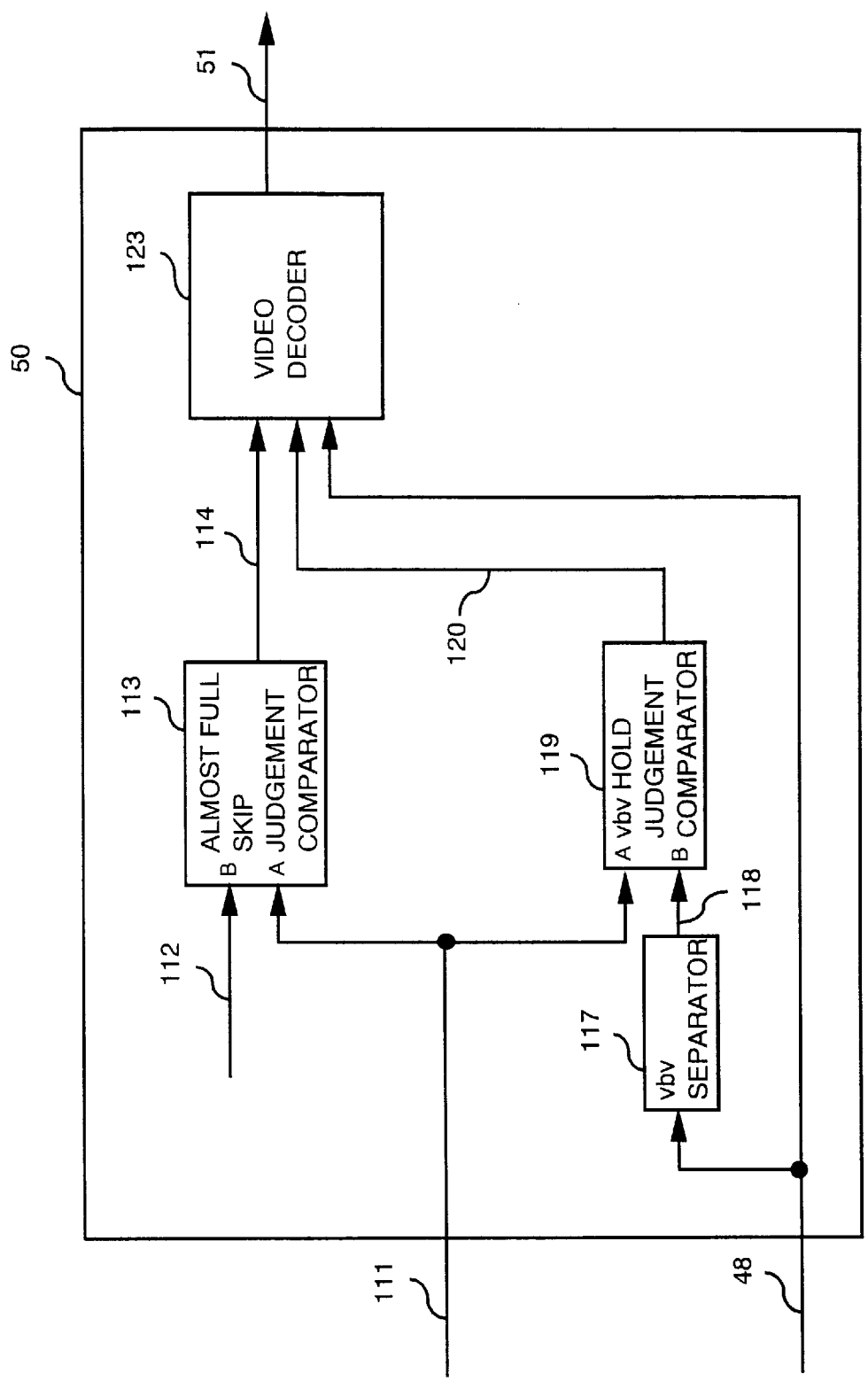
FIG. 12 shows a block diagram of a video decoder of a seventh embodiment of the present invention.

FIG. 12 shows a block diagram of the video decoder 50. In FIG. 12, the video decoder 50 comprises a video buffer storage value 111 which shows the number of bits stored in the compressed video data buffer memory 45, an almost full threshold 112, an almost full skip judgment comparator 113, an almost full skip control signal 114, a vbv (variable buffer verifier) separator 117, a vbv (variable buffer verifier) storage value 118, a vbv (variable buffer verifier) hold judgement comparator 119, a vbv (variable buffer verifier) hold control signal 120, and a video decoder 123.

An operation of the decoder 50 of the seventh embodiment is explained below using FIG. 12. A condition, in which the number of bits stored in the compressed video data buffer memory 45 (video buffer storage) is equal to the capacity of the compressed video data buffer memory 45, is referred to as full, while a condition, in which the number of bits stored in the compressed video data buffer memory is 0, is referred to as empty. If the number of stored bits is in the full or in the empty condition, normal decoding operation is inhibited, and the system hangs up. The video buffer storage value 111 is compared with the predetermined almost full threshold 112 in the almost full skip judgement comparator 113. The almost full skip judgement comparator 113 outputs the almost full skip control signal 114, when the video buffer storage value 111 is larger than the almost full threshold 112.

In response to the almost full skip control signal 114, the next B picture is skipped and the compressed decoded video data 48 of B picture is abandoned in the video decoder 123 to avoid the full condition. The vbv separator 117 separates the vbv delay from the decoded video data 48 and outputs the vbv storage value 118. The vbv hold judgement comparator 119 compares the vbv storage value 118 with the video buffer storage value 111. When the video buffer storage value 111 is smaller than the vbv storage value 118, the vbv hold judgement comparator 119 outputs the vbv hold control signal 120. In response to the vbv hold control signal 120, the video decoder 123 holds the next decoded video data 48 and does not read out the next decoded video data 48 to avoid the empty condition. In the same way as the control of the video data, the audio data can be controlled by skipping/holding the decoded audio data 28 for an audio frame unit, using almost empty threshold 112 in place of the vbv storage value 118.

According to the seventh embodiment, the system does not hang up even though the capacity of the compressed data buffer memory 45 largely increases or decreases, because the output audio data 31 is synchronized with the display video data 51 using time stamps, and then the full and empty conditions can be avoided.

Embodiment 8

There happens that synchronization using video time stamps (PTS and/or DTS) can not be carried out, since every video frame does not necessarily have a video time stamp (PTS and/or DTS). In an eighth embodiment, if the decoded video data of the video frame does not have the video time stamp (PTS and/or DTS), the decoding is started when the number of bits stored in the compressed video data buffer memory are equal or more than the vbv storage value by controlling the vbv storage value. Then, the video data is synchronized with the audio data when the first video time stamp (PTS and/or DTS) appears.

Figure 13:
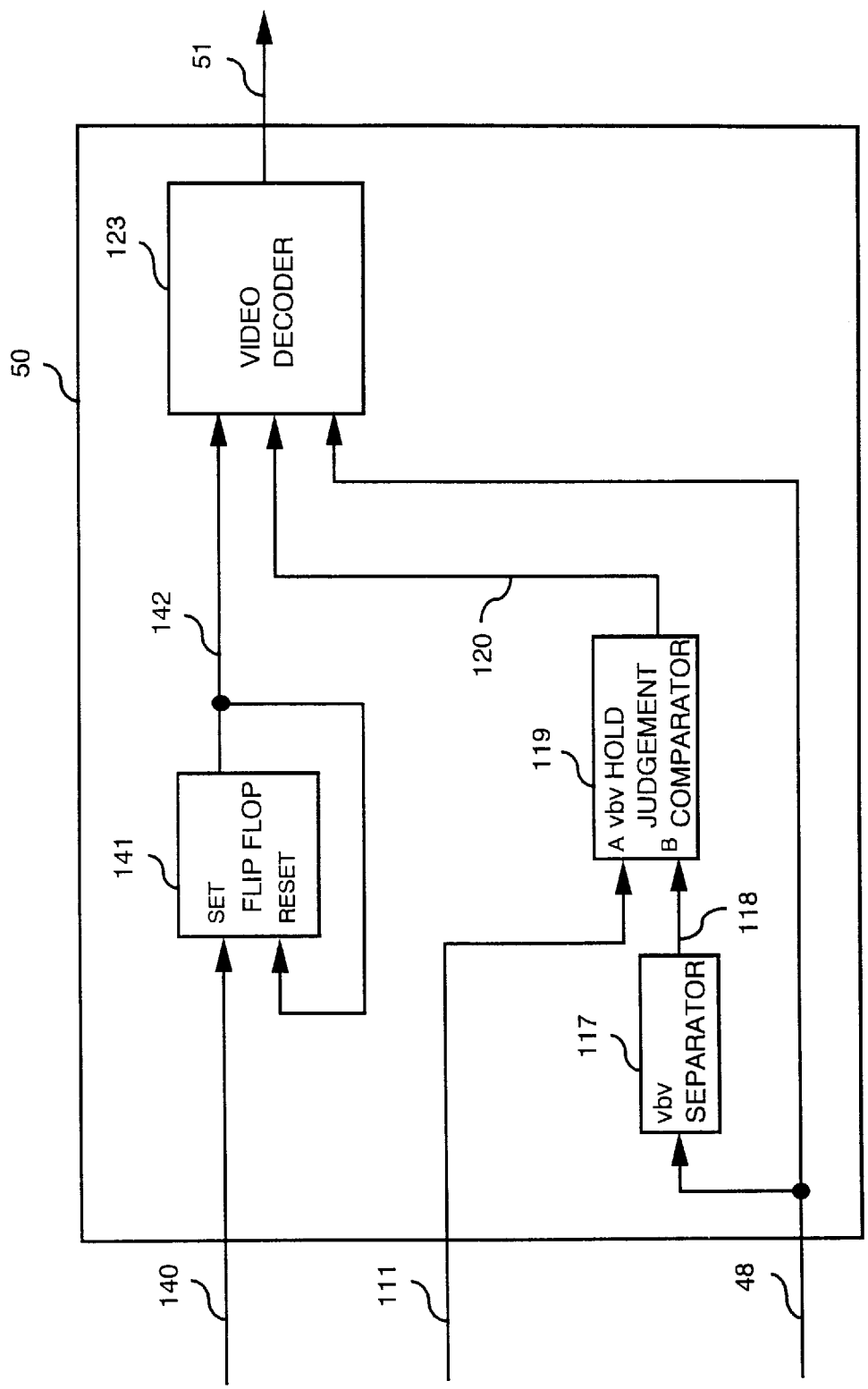
FIG. 13 shows a block diagram of a video decoder of an eighth embodiment of the present invention.

FIG. 13 shows a block diagram of the video decoder 50 of an eighth embodiment of the present invention. In FIG. 13, the decoder 50 includes a video time stamp presence/absence signal 140, a flip flop 141, and a flip flop output 142. When the video time stamp presence/absence signal 140 disclose that the video frame does not include the video time stamp (PTS and/or DTS), the flip flop 141 is set and the flip flop output 142 becomes "H" level. The vbv hold control signal 120 is used to control the start of decoding the decoded video data 48 until the preceding video frame to the video frame in which the video time stamp (PTS and/or DTS) exists. Once video time stamp (PTS and/or DTS) appears, the flip flop 141 is reset, and the flip flop output 142 turns to "L" level. After then, the synchronization is controlled by video time stamps (PTS and/or DTS).

Figure 14:
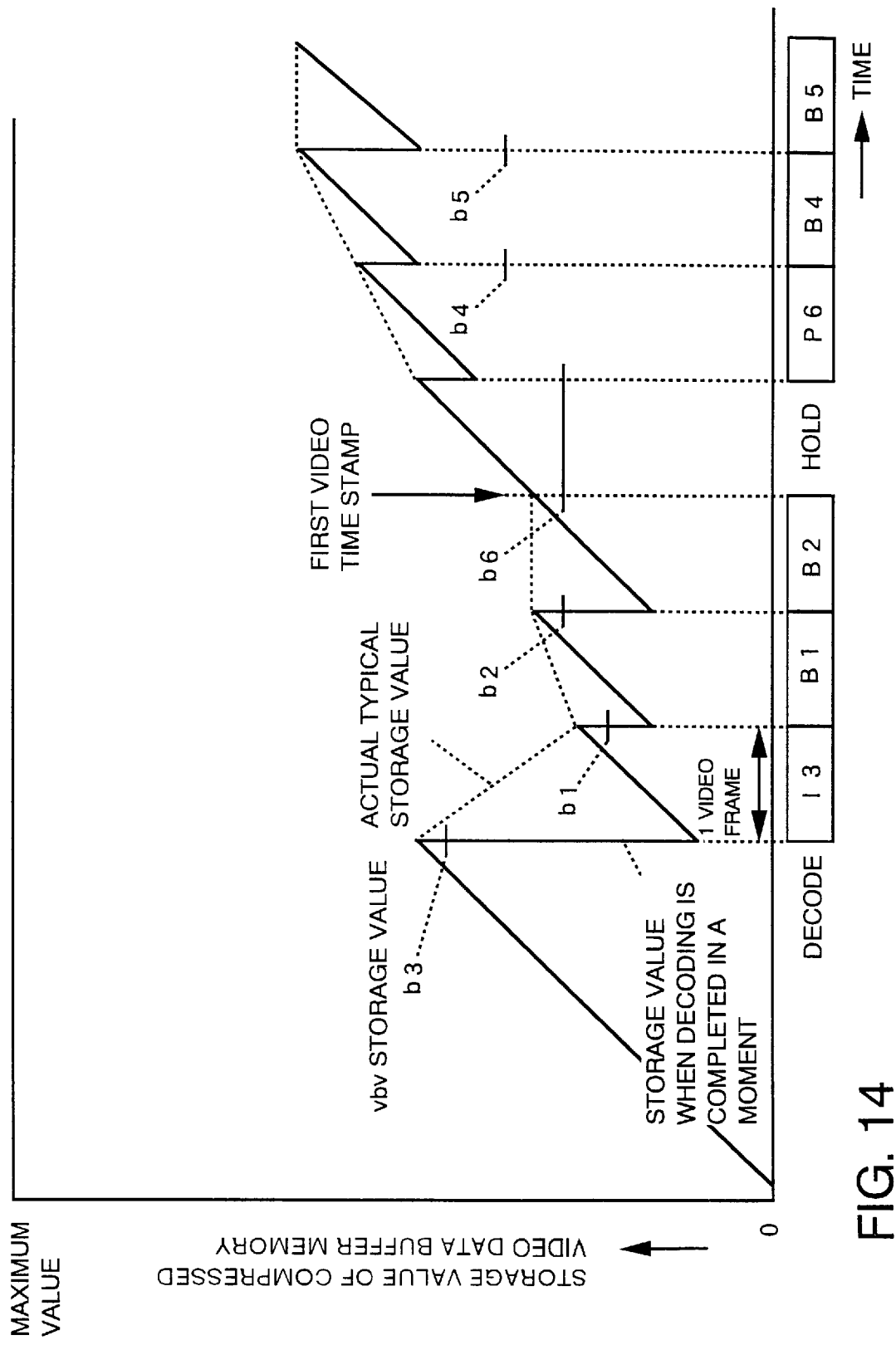
FIG. 14 shows a storage and a timing chart of a compressed video data buffer memory of the eighth embodiment of the present invention.

FIG. 14 shows a timing chart of decoding the decoded video data and a storage value of the compressed video data buffer memory 45 of the eighth embodiment of the present invention. FIG. 14 shows a case where the decoded video data are decoded in the order of I picture I3, B picture B1, B picture B2, P picture P6, B picture B4, B picture B5 . . . , and a first video time stamp (PTS and/or DTS) appeared at the P picture P6. When the storage value of the compressed video data buffer memory 45 excesses respective vbv storage values b3, b1, and b2 for I pictures I3, B picture B1, and B picture B2, the decoded video data 48 of the I picture I3, B picture B1, and B picture B2 start to be decoded, respectively. In case that the video time stamp (PTS and/or DTS) appears for the first time at the P picture P6, the synchronization control is carried out using the video time stamp (PTS and/or DTS) when the decoding of the decoded video data 48 of the P picture P6 is started. In this example, if the condition of STC=DTS (P6)−T is approximately satisfied at the start point for decoding the decoded video data 48 of the P picture P6, the decoding is stopped (held) before the first frame of the P picture P6, after then, synchronization is carried out using video time stamp (PTS and/or DTS) instead of vbv storage value.

In the eighth embodiment, the system is prevented from hang-up, in case that the video time stamp does not exist in the first video frame to be decoded.

Embodiment 9

If the storage value of the compressed video data buffer memory 45 is slightly larger than the vbv storage value of the first video frame, the storage value of the compressed video data buffer memory 45 is slightly larger than the vbv storage value for the second and subsequent video frames. Therefore, the storage value of the compressed video data buffer memory 45 can be smaller than the vbv storage value, according to the jitter and the operation accuracy of video data synchronization. Accordingly, the compressed video data buffer memory 45 is held in such condition. In a ninth embodiment, the vbv delay buffer threshold used for the first video frame is decided to be larger than that for the second and subsequent video picture frames.

Figure 17:
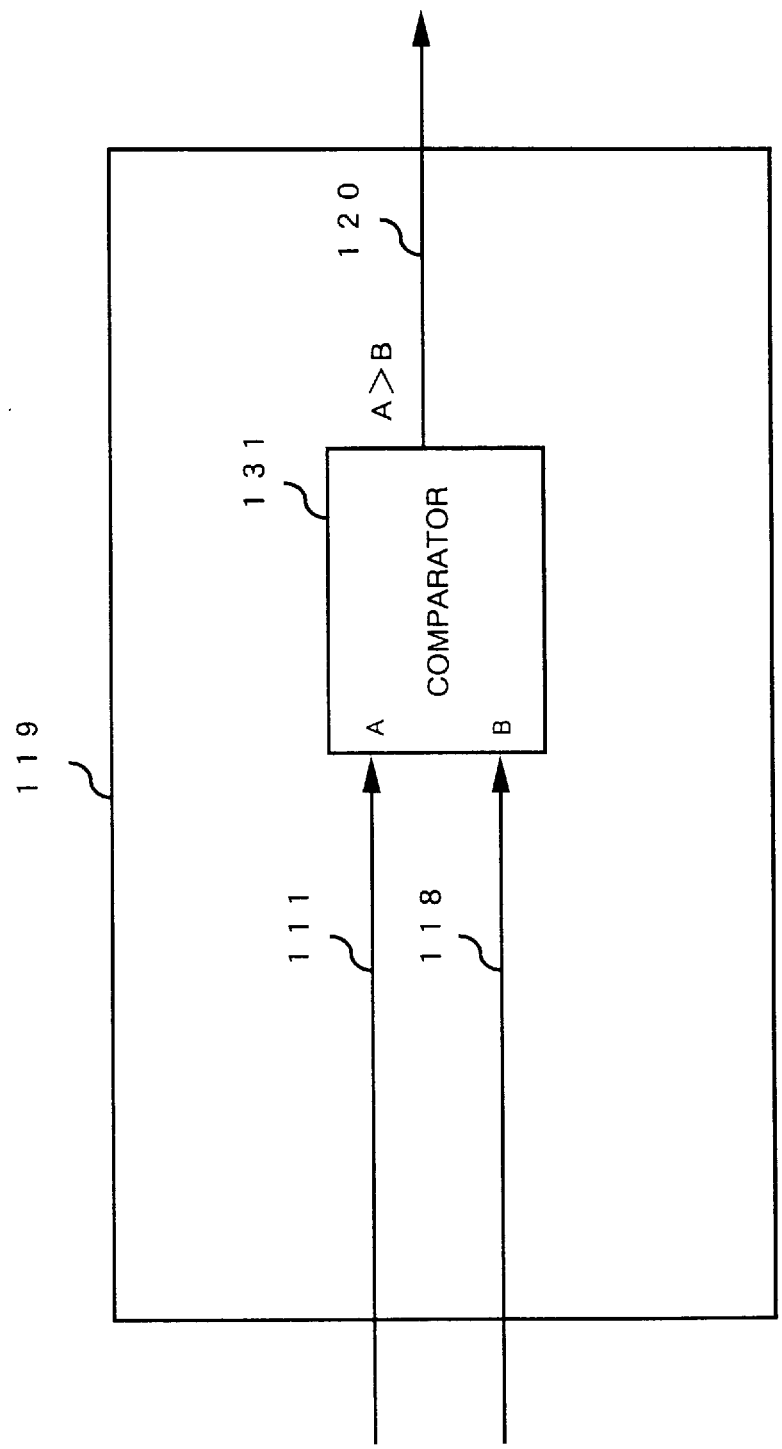
FIG. 17 shows a detailed conventional vbv hold judgment comparator.

FIG. 17 shows a detailed a conventional vbv hold judgement comparator 119. The conventional vbv hold judgement comparator 119 comprises a comparator 131. In FIG. 17, the comparator 131 simply compares the video buffer storage value 111 with the vbv storage value 118, and the decoding of the decoded video data 48 of each video frame is started at the condition of video buffer storage value>vbv storage value.

Figure 18:
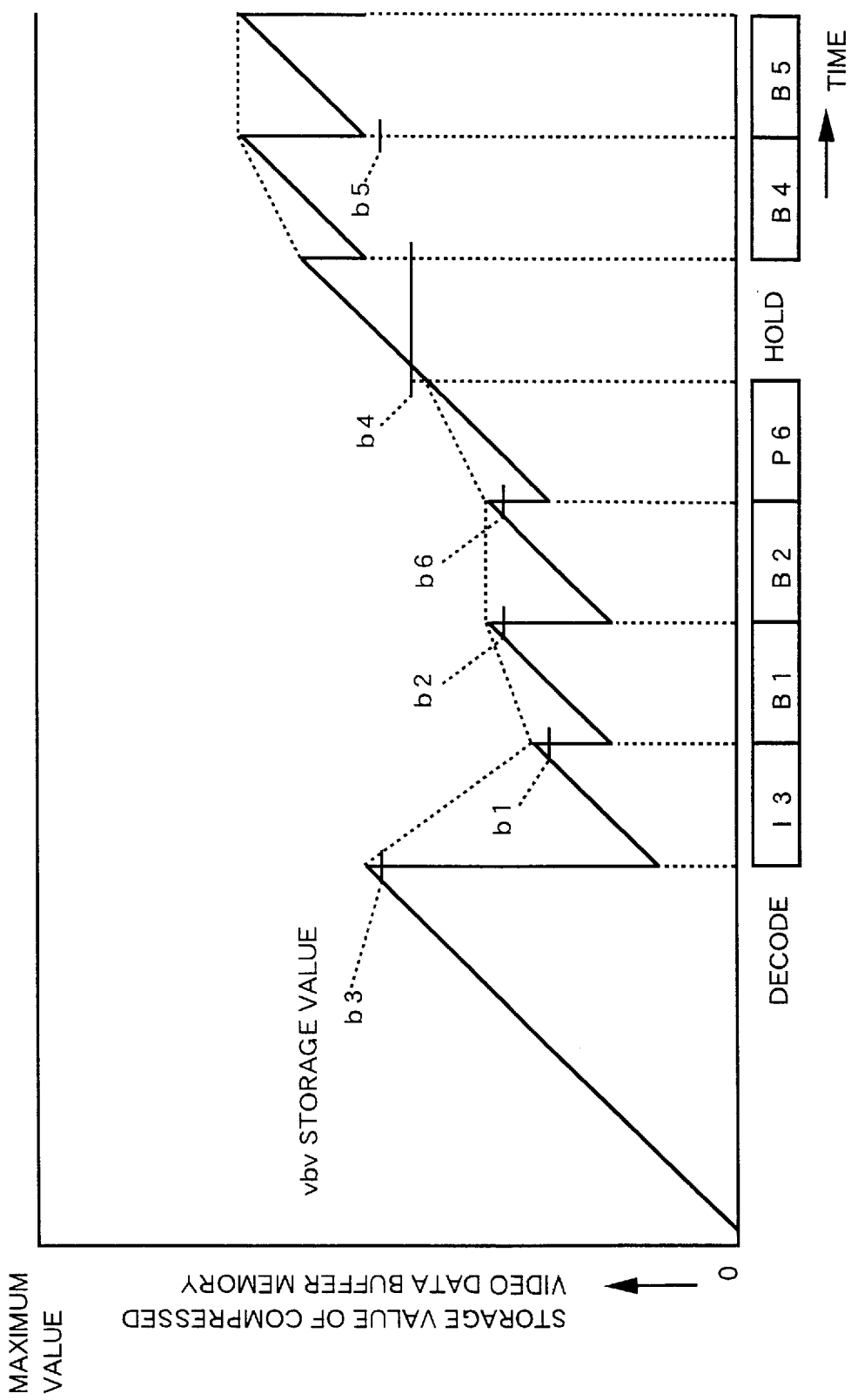
FIG. 18 shows a storage value and a timing chart of a conventional compressed video data buffer memory.
Figure 19:
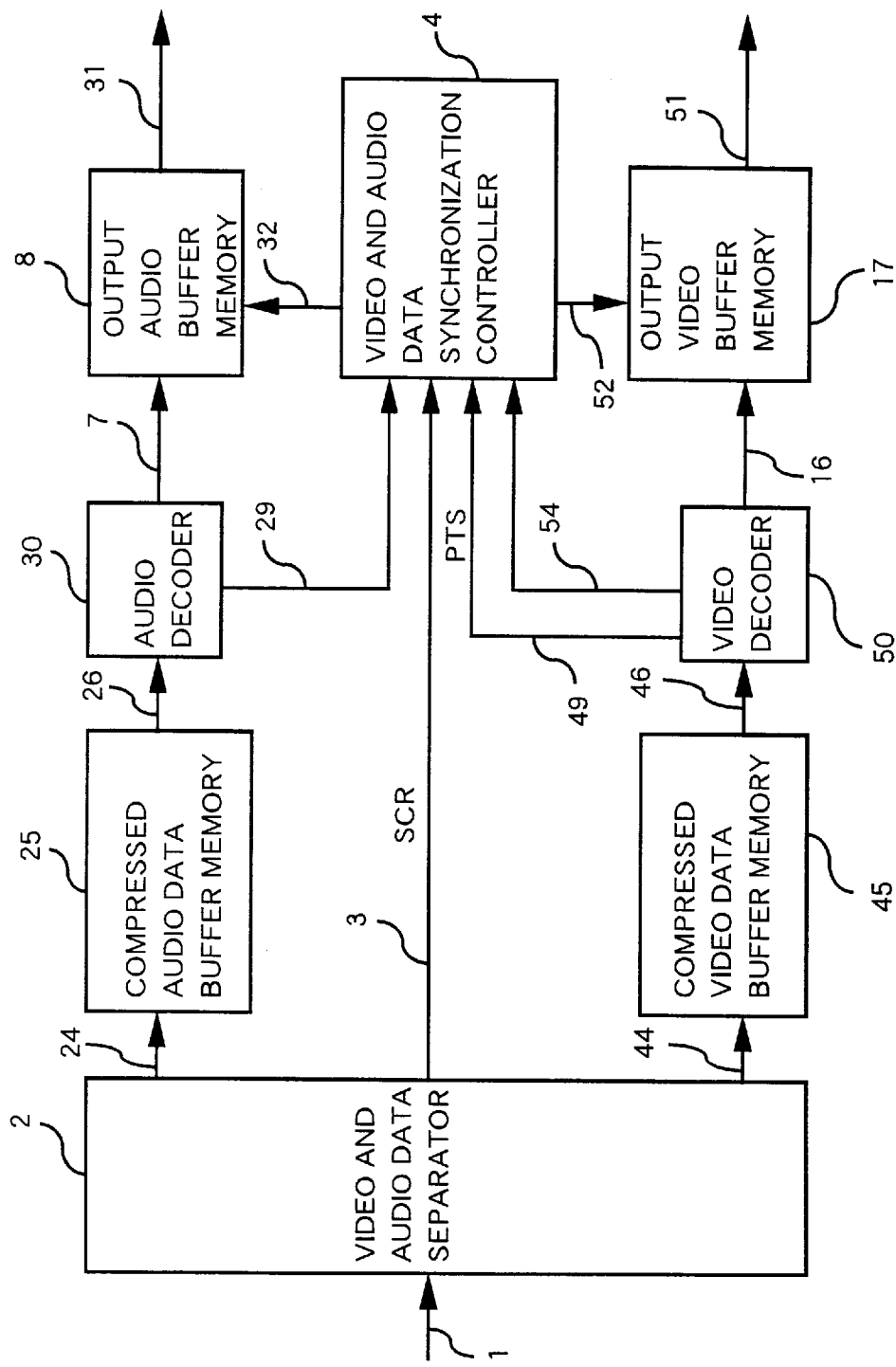
FIG. 19 shows a conventional apparatus for extending and reproducing video data and audio data.

FIG. 18 shows a timing chart of decoding the decoded video data and a storage value of the compressed video data buffer memory 45 of the prior art. As shown in FIG. 18, in case that the video buffer storage value of the compressed video data buffer memory 45 is slightly larger than the vbv storage value b3 for the I picture I3 which is decoded for the first time, the video buffer storage value of the compressed video data buffer memory 45 is slightly larger than the vbv storage value for the second and subsequent video frames. When the decoded video data 48 of the B picture B4 is decoded, since the video buffer storage value of the compressed video data buffer memory 45 becomes smaller than the vbv storage value b4 according to the operational error of the vbv storage value and jitter of timing, the decoded video data 48 of the B picture B4 is not decoded. After a period of one frame, the decoding of the decoded video data 48 of the B picture B4 is started since the video buffer storage value of the compressed video data buffer memory 45 exceeds the vbv storage value b4. Since the decoding of the decoded video data 48 of the B picture B4 is held for one frame, a display video data 51 held for a period of one frame is outputted from the video decoder 50.

Figure 15:
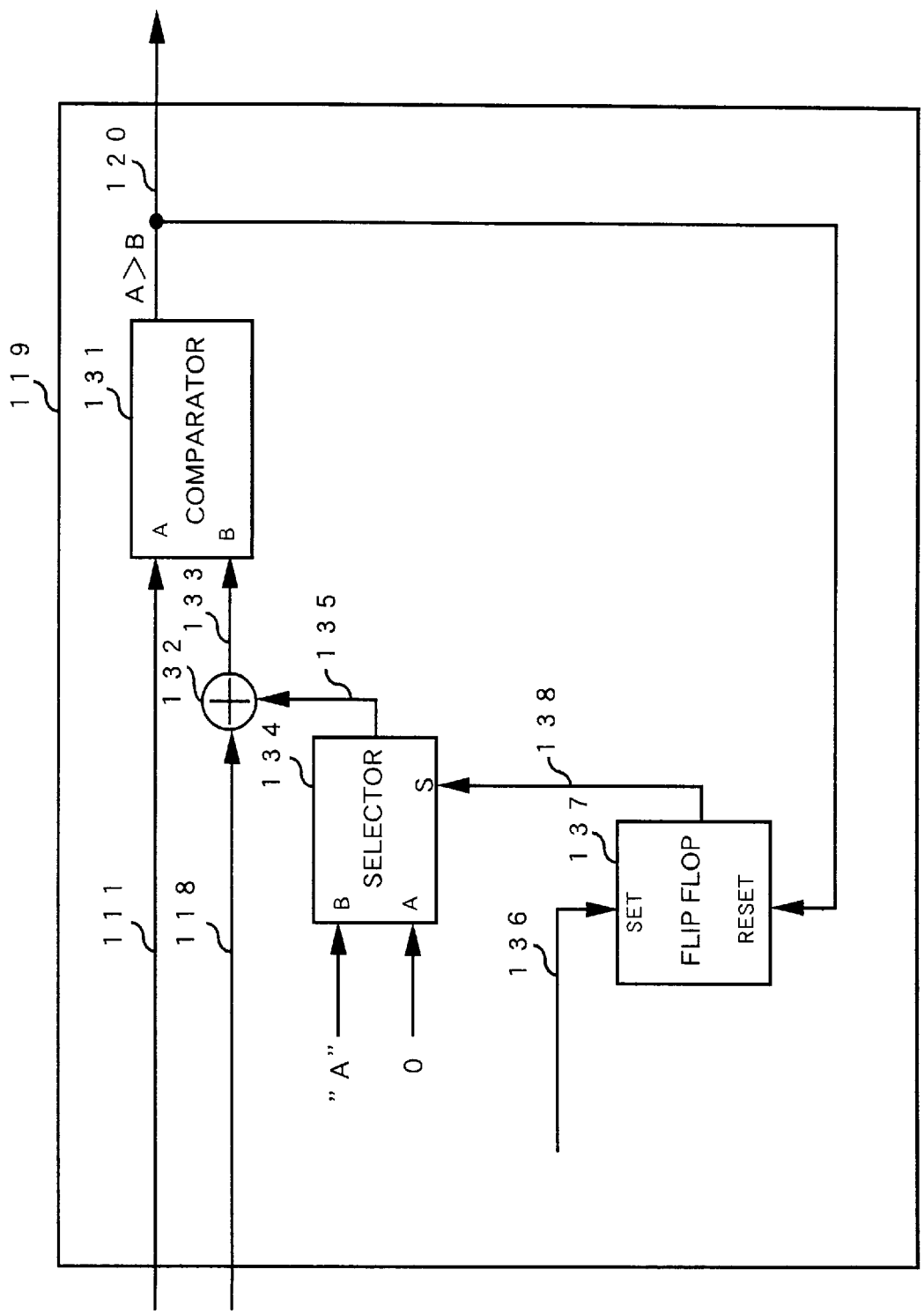
FIG. 15 shows a detail of a vbv hold judgment comparator of a ninth embodiment of the present invention.

FIG. 15 shows a detailed a vbv hold judgement comparator 119 of a ninth embodiment of the present invention. In FIG. 15, the vbv hold judgement comparator 119 comprises an adder 132, an adder output 133, a selector 134, a selector output 135, a first frame set signal 136, a flip flop 137, and a flip flop output 138. When the decoding starts after the hold state, the first frame set signal 136 sets the flip flop 137, and then the flip flop output 138 becomes "H" level, which allows the selector 134 to select the side B to obtain offset of "A" as the selector output 135. The selector output 135 is added to the vbv storage value 118 at the adder 132. The comparator 131 compares the adder output 133 with the video buffer storage value 111, and starts to decode only the decoded video data 48 of the first video frame on the condition of video buffer storage value>vbv storage value+A. Where, the offset is assumed to be A, but it may be equal to or larger than maximum error due to operation accuracy of the apparatus or jitter of timing. In case the flip flop 137 is reset when the decoded video data 48 of the first video frame starts to be decoded, the decoded video data 48 of the second and subsequent video frames are started to be decoded on the condition of video buffer storage value>the vbv storage value, without offset as set forth in the prior art.

Figure 16:
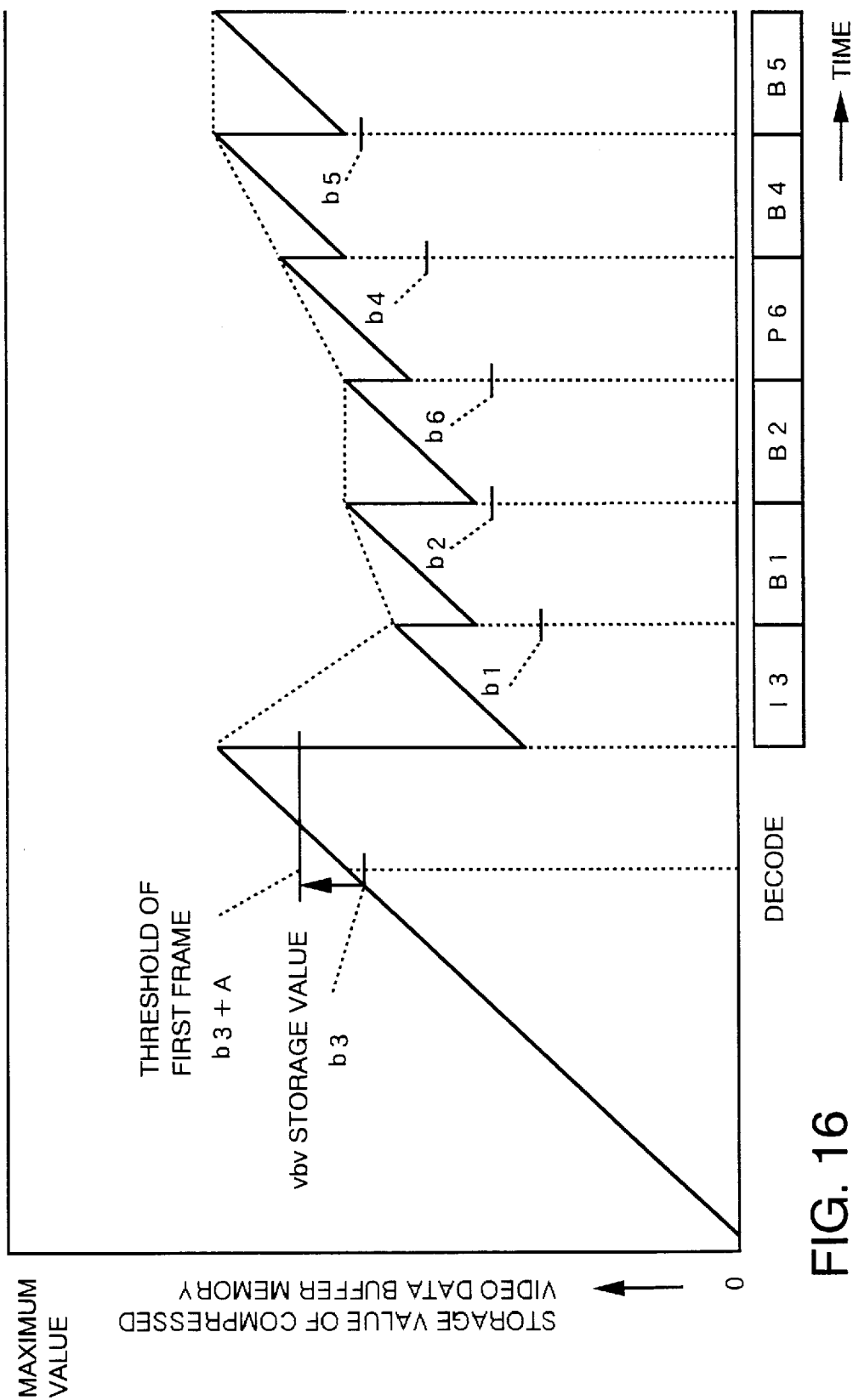
FIG. 16 shows a storage and a timing chart of a compressed video data buffer memory of the ninth embodiment of the present invention.

FIG. 16 shows a timing charge of decoding the decoded video data and a storage value of the compressed video data buffer memory 45 of the ninth embodiment of the present invention. In FIG. 16, the decoded video data 48 is decoded in the order of I picture I3, B picture B1, B picture B2, P picture P6, B picture B4, B picture B5 . . . The vbv storage value for the respective pictures are referred to as b3, b1, b2, b6, b4, b5 . . . For the first frame, b3+A (A is larger than error due to jitter or operation accuracy of video synchronization) is used as a hold threshold. In this case, the video buffer storage value of the compressed video data buffer memory 45 is larger than the vbv delay buffer values by A for the decoding of the decoded video data of the video frames after the second frame. Therefore, the decoding by the video decoder 123 does not held during normal reproduction.

As explained above, in the ninth embodiment, the decoding of the video data by the video decoder 123 is not held during the normal reproduction, according to the error of jitter or operation accuracy for the second and subsequent video frames.

What is claimed is:

1. A video and audio data synchronization controller of an apparatus for extending and reproducing compressed video and audio multiplexed data comprising:

system time clock generating means for outputting firstly a system time clock having a timing set in accordance with a system clock reference separated from compressed video and audio multiplexed data, the value of the timing of the system time clock being incremented, and for outputting secondly a system time clock having a timing reset in accordance with a video time stamp included in a first video frame, the value of the timing of the secondly output system time clock being incremented, when a decoded video data of a first video frame separated from the compressed video and audio multiplexed data is decoded by a video decoder and display video data is output;

a comparator for the audio data for comparing the system time clock output from said system time clock generating means with an audio time stamp separated from the compressed video and audio multiplexed data and outputting an audio output start signal when the system time clock agrees with the audio time stamp; and a comparator for the video data for comparing the system time clock output from said system time clock generating means with a video time stamp and outputting a video output start signal when the system time clock agrees with the video time stamp.

2. An apparatus for extending and reproducing compressed video and audio multiplexed data and outputting display video data synchronously with output audio data comprising:

a video and audio data separator for separating and outputting video data, a video time stamp, audio data, and an audio time stamp from the compressed video and audio multiplexed data;

an audio multiplexer for multiplexing the audio data and the audio time stamp from the video and audio separator and outputting audio multiplexed data;

a video multiplexer for multiplexing the video data and the video time stamp from the video and audio separator and outputting video multiplexed data;

an audio multiplexed data memory for delaying the audio multiplexed data from said audio multiplexer;

a video multiplexed data memory for delaying the video multiplexed data from said video multiplexer;

an audio separator for separating and outputting decoded audio data and the audio time stamp output from the audio multiplexed data from said audio multiplexed data memory;

a video separator for separating and outputting decoded video data and the video time stamp from the video multiplexed data from said video multiplexed data memory;

a video and audio data synchronization controller for generating a system time clock, and comparing the audio time stamp from said audio separator with the system time clock and outputting an audio output start signal when the system time clock agrees with the audio time stamp, and comparing the video time stamp from said video separator with the system time clock and outputting a video output start signal when the system time clock agrees with the audio time stamp;

an audio decoder for starting to decode the decoded audio data from said audio separator in accordance with the audio output start signal from said video and audio data synchronization controller, and outputting the output audio data; and a video decoder for starting to decode the decoded video data from said video separator in accordance with the video output start signal from said video and audio data synchronization controller, and outputting the display video data.

3. An apparatus for extending and reproducing compressed video and audio multiplexed data and outputting display video data synchronously with output audio data comprising:

a video and audio separator for separating and outputting video data, a video time stamp, audio data, and an audio time stamp from compressed video and audio multiplexed data;

an audio data memory for delaying the audio data from the video and audio separator and outputting decoded audio data;

a video data memory for delaying the video data from said video and audio separator and outputting decoded data;

an audio time stamp memory for delaying and outputting the audio time stamp from said video and audio separator;

a video time stamp memory for delaying and outputting the video time stamp from said video and audio separator;

an audio address memory for temporarily storing a writing address of said audio data memory corresponding to the audio data from said video and audio data separator written in said audio data memory, and delaying and outputting the writing address of said audio data memory;

a video address memory for temporarily storing a writing address of said video data memory corresponding to the video data from said video and audio data separator written in said video data memory, and delaying and outputting the writing address of said video data memory;

an audio address comparator for comparing a reading out address of said audio data memory corresponding to a decoded audio data read from said audio data memory with the writing address from said audio address memory, and outputting an audio time stamp latch signal when the reading-out address of said audio data memory agrees with the writing address from said audio address memory;

a video address comparator for comparing a reading-out address of said video data memory corresponding to a decoded video data read from said video data memory with the writing address from said video address memory, and outputting a video time stamp latch signal when the reading-out address of the video data memory agrees with the writing address from said video address memory;

an audio time stamp latch for latching the audio time stamp from said audio time stamp memory in response to the video time stamp latch signal from said audio address comparator, and outputting the audio time stamp latched therein;

a video time stamp latch for latching the video time stamp from said video time stamp memory in response to the audio time stamp latch signal from said video address comparator, and outputting the video time stamp latched therein;

a video and audio data synchronization controller for generating a system time clock, and comparing the audio time stamp from said audio time stamp latch with the system time clock and outputting an audio output start signal when the system time clock agrees with the audio time stamp, and comparing the video time stamp from said video time stamp latch with the system time clock and outputting a video output start signal when the system time clock agrees with the video time stamp;

an audio decoder for starting to decode the decoded audio data from said audio separator in accordance with the audio output start signal from said video and audio data synchronization controller, and outputting the output audio data; and a video decoder for starting to decode the decoded video data from said video separator in accordance with the video output start signal from said video and audio data synchronization controller, and outputting the display video data.

4. An apparatus for extending and reproducing compressed video and audio multiplexed data and outputting display video data synchronously with output audio data comprising:

a video and audio data synchronization controller receiving a system clock reference, a video time stamp, and an audio time stamp, all separated from the compressed video and audio multiplexed data, and outputting a video output start signal and an audio output start signal;

a video decoder receiving decoded video data separated from the compressed video and audio multiplexed data and the video output start signal of said video and audio data synchronization controller, starting decoding of decoded video data in response to said video output start signal, and outputting display video data; and an audio decoder receiving decoded audio data separated from the compressed video and audio multiplexed data and the audio output start signal of said video and audio data synchronization controller, starting decoding of decoded audio data in response to the audio output start signal, and outputting an output audio data, wherein said video and audio data synchronization controller includes:

system time clock generating means for outputting firstly a system time clock having a timing set in accordance with a system clock reference separated from compressed video and audio multiplexed data, the value of said timing of said system time clock being incremented, and for outputting secondly a system time clock having a timing reset in accordance with a video time stamp included in a first video frame, the value of the timing of the secondly output system time clock being incremented when decoded video data of a first video frame separated from the compressed video and audio multiplexed data is decoded by a video decoder and display video data is output;

a comparator for the video data for comparing the received video time stamp with a system time clock from said system time clock generating means, and for outputting the video output start signal when the received video time stamp agrees with the system time clock; and a comparator for the audio data for comparing the received audio time stamp with a system time clock from said system time clock generating means, and for outputting the audio output start signal when the received audio time stamp agrees with said system time clock.

5. An apparatus for extending and reproducing compressed video and audio multiplexed data and outputting display video data synchronously with output audio data comprising:

a video and audio data separator for separating and outputting video data, a video time stamp, audio data, and an audio time stamp from the compressed video and audio multiplexed data;

a video data memory for delaying the video data from said video and audio data separator, and outputting the video data as a decoded video data;

a first video frame counter for counting the number of video frames in the video data written in said video data memory, and outputting the number as a video frame count value;

a video frame counter memory for delaying and outputting the video frame count value from said first video frame counter;

a second video frame counter for counting the number of video frames in the decoded video data read-out from said video data memory, and outputting the number as the value of the count;

a video frame count value comparator for comparing the video frame count value from said second video frame counter with the video frame count value from said first video frame counter, and outputting a video time stamp latch signal when the video frame count value from said second video frame counter agrees with the video frame count value from said first video frame counter;

a video time stamp memory for delaying and outputting the video time stamp from said video and audio data separator;

a video time stamp latch for latching the video time stamp from said video time stamp memory and outputting the latched video time stamp, when the video time stamp latch signal from said video frame count value comparator is received;

an audio data memory for delaying the audio data from said video and audio data separator, and outputting the audio data as decoded audio data;

a first audio frame counter for counting the number of audio frames in the audio data written in said audio data memory, and outputting the number as the value of an audio frame count value;

an audio frame counter memory for delaying and outputting the audio frame count value from said first audio frame count value;

a second audio frame counter for counting the number of audio frames in the decoded audio data read-out from said audio data memory, and outputting the value as an audio frame count value;

an audio frame count value comparator for comparing the audio frame count value from said second audio frame counter with the audio frame count value from said first audio frame counter, and outputting an audio time stamp latch signal when the audio frame count value from said second audio frame counter agrees with the audio frame count value from said first audio frame counter;

an audio time stamp memory for delaying and outputting the audio time stamp from said video and audio data separator;

an audio time stamp latch for latching the audio time stamp from said audio time stamp memory and outputting the latched audio time stamp, when the audio time stamp latch signal from said audio frame count value comparator is received;

a video and audio data synchronization controller for generating a system time clock, comparing the video time stamp from said video time stamp latch with the system time clock for outputting a video output start signal when said video time stamp agrees with the system time clock, and comparing the audio time stamp from said audio time stamp latch with the system time clock for outputting an audio start signal when said audio time stamp agrees with the system time clock;

a video decoder for starting decoding of the decoded video data from said video data memory in response to the video output start signal from said video and audio data synchronization controller, and outputting the display video data; and an audio decoder for starting decoding of the decoded audio data from said audio data memory in response to the audio output start signal from said video and audio data synchronization controller, and outputting the output audio data.

6. An apparatus for extending and reproducing a compressed video and audio multiplexed data and outputting display video data synchronously with output audio data comprising:

a video and audio data separator for separating and outputting video data, a video time stamp, audio data, and an audio time stamp from the compressed video and audio multiplexed data;

a video data memory for delaying the video data from said video and audio data separator, and outputting the video data as decoded video data;

a first video frame counter for counting the number of video frames in the video data written in said video data memory, and outputting the number as a video frame count value;

a video frame counter memory for delaying and outputting the video frame count value from said first video frame counter;

a second video frame counter for counting the number of video frames in the decoded video data read-out from said video data memory, and outputting the number as a video frame count value;

a video frame count value comparator for comparing the video frame count value from said second video frame counter with the video frame count value from said first video frame counter, and outputting a video time stamp latch signal when the video frame count value from said second video frame counter agrees with the video frame count value from said first video frame counter;

a video time stamp latch for latching the video time stamp from said video and audio data separator and outputting the latched video time stamp, when the video time stamp latch signal from said video frame count value comparator is received;

an audio data memory for delaying the audio data from said video and audio data separator, and outputting the audio data as decoded audio data;

a first audio frame counter for counting the number of audio frames in the audio data written in said audio data memory, and outputting the number as an audio frame count value;

an audio frame counter memory for delaying and outputting the audio frame count value from said first audio frame counter;

a second audio frame counter for counting the number of audio frames in the decoded audio data read-out from said audio data memory, and outputting the number as an audio frame count value;

an audio frame count value comparator for comparing the audio frame count value from said second audio frame counter with the audio frame count value from said first audio frame counter, and outputting an audio time stamp latch signal when the audio frame count value from said second audio frame counter agrees with said audio frame count value from said first audio frame counter;

an audio time stamp latch for latching the audio time stamp from said video and audio data separator and outputting the latched audio time stamp, when the audio time stamp latch signal from said audio frame count value comparator is received;

a video and audio data synchronization controller for generating a system time clock, comparing the video time stamp from said video time stamp latch with the system time clock for outputting a video output start signal when the video time stamp agrees with the system time clock, and comparing the audio time stamp from said audio time stamp latch with the system time clock for outputting an audio start signal when the audio time stamp agrees with the system time clock;

a video decoder for starting decoding of the decoded video data from said video data memory in response to the video output start signal from said video and audio data synchronization controller, and outputting the display video data; and an audio decoder for starting decoding of the decoded audio data from said audio data memory in response to the audio output start signal from said video and audio data synchronization controller, and outputting the output audio data.

\* \* \* \* \*